US012562113B2

(12) United States Patent
Yokoyama et al.

(10) Patent No.: US 12,562,113 B2
(45) Date of Patent: Feb. 24, 2026

(54) DISPLAY DEVICE

(71) Applicant: Sharp Display Technology Corporation, Kameyama (JP)

(72) Inventors: Makoto Yokoyama, Kameyama (JP); Nobuyuki Taya, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 60 days.

(21) Appl. No.: 18/692,941

(22) PCT Filed: Nov. 12, 2021

(86) PCT No.: PCT/JP2021/041764
§ 371 (c)(1),
(2) Date: Aug. 21, 2024

(87) PCT Pub. No.: WO2023/084744
PCT Pub. Date: May 19, 2023

(65) Prior Publication Data

US 2025/0322791 A1 Oct. 16, 2025

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/0286* (2013.01); *G09G 2310/0294* (2013.01); *G09G 2310/08* (2013.01)

(58) Field of Classification Search
None
See application file for complete search history.

(56) References Cited

U.S. PATENT DOCUMENTS

2007/0008268 A1* 1/2007 Park ....................... G11C 19/28 345/92
2007/0046601 A1* 3/2007 Shin ..................... G09G 3/3607 345/89
2007/0063950 A1 3/2007 Shin
(Continued)

FOREIGN PATENT DOCUMENTS

JP 2006-107566 A 4/2006
JP 2007-086728 A 4/2007

*Primary Examiner* — Dorothy Harris
(74) *Attorney, Agent, or Firm* — Keating & Bennett, LLP

(57) ABSTRACT

A display device is implemented that can increase the refresh rate while suppressing an increase in the area of a picture frame and a reduction in reliability. In a first picture-frame region there are disposed a first and a third write control circuit that drive even-numbered write control lines and odd-numbered write control lines, respectively, and a first initialization control circuit that drives even-numbered initialization control lines. In a second picture-frame region there are disposed a second and a fourth write control circuit that drive the even-numbered write control lines and the odd-numbered write control lines, respectively, and a second initialization control circuit that drives odd-numbered initialization control lines. LTPS-TFTs are adopted for all transistors included in a first unit circuit in a shift register that implements each write control circuit. A second unit circuit in a shift register that implements each initialization control circuit has a latch function and drives an initialization control line based on a value held internally.

15 Claims, 29 Drawing Sheets

(56) References Cited

U.S. PATENT DOCUMENTS

| | | | | |
|---|---|---|---|---|
| 2008/0191980 | A1* | 8/2008 | Jeon | G09G 3/3677 345/87 |
| 2014/0078124 | A1* | 3/2014 | Chen | G09G 3/3696 345/205 |
| 2019/0371236 | A1* | 12/2019 | Sakai | G09G 3/3233 |
| 2020/0410939 | A1* | 12/2020 | Li | G09G 3/3266 |
| 2021/0358384 | A1* | 11/2021 | Liu | G09G 3/2092 |

* cited by examiner

Fig.27 -PRIOR ART-

Fig.30 -PRIOR ART-
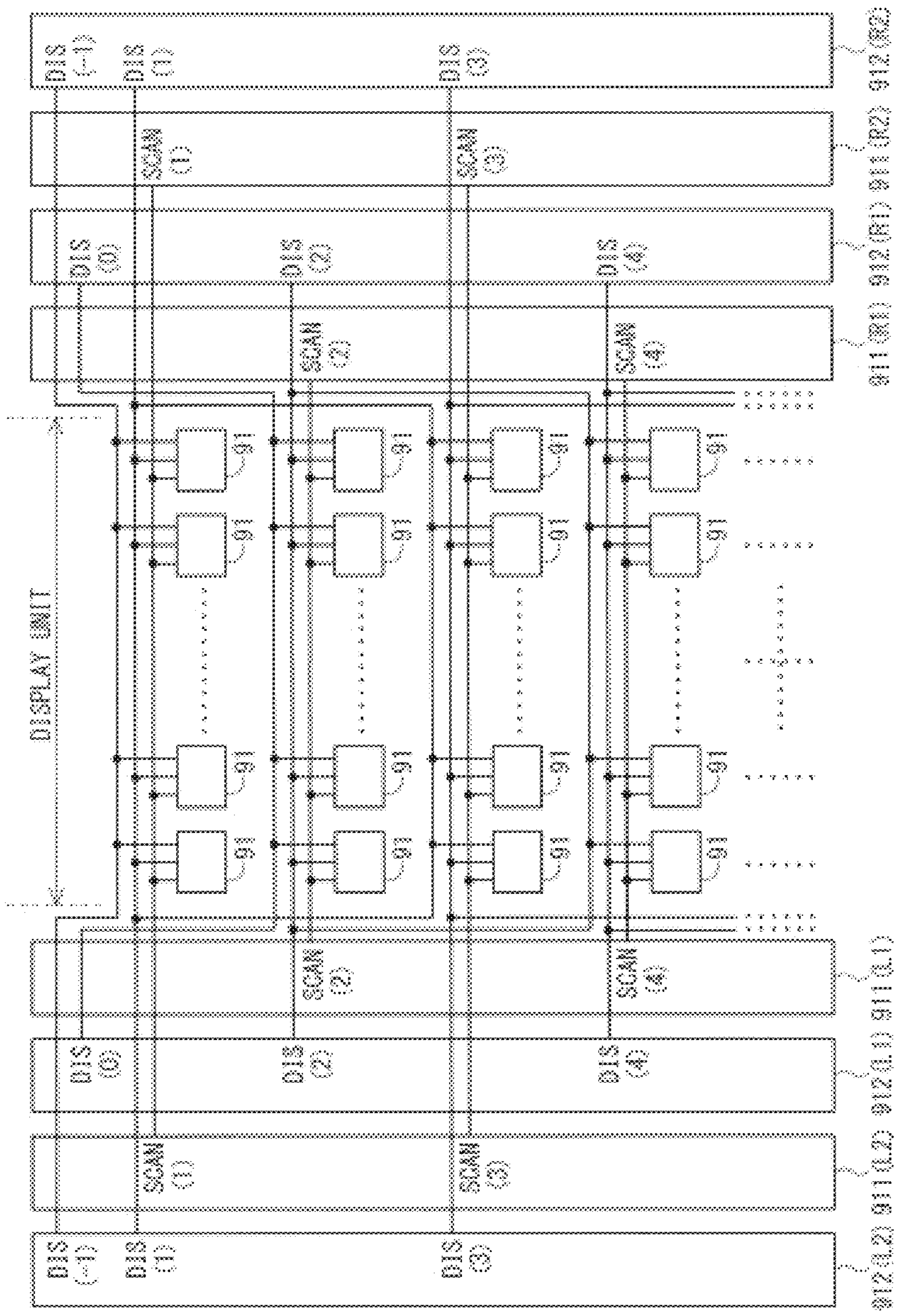

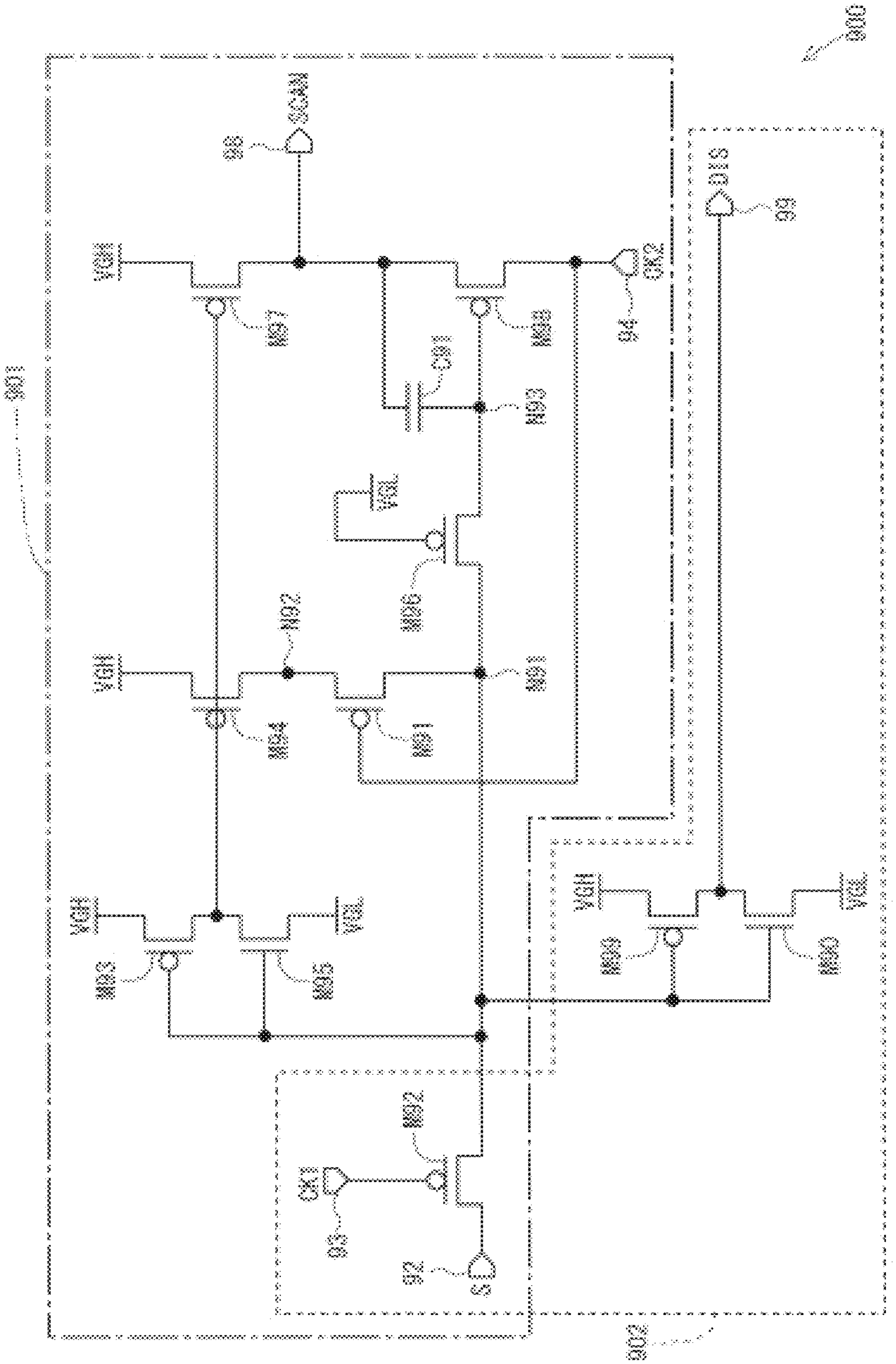
Fig.31 -PRIOR ART-

Fig.32 -PRIOR ART-
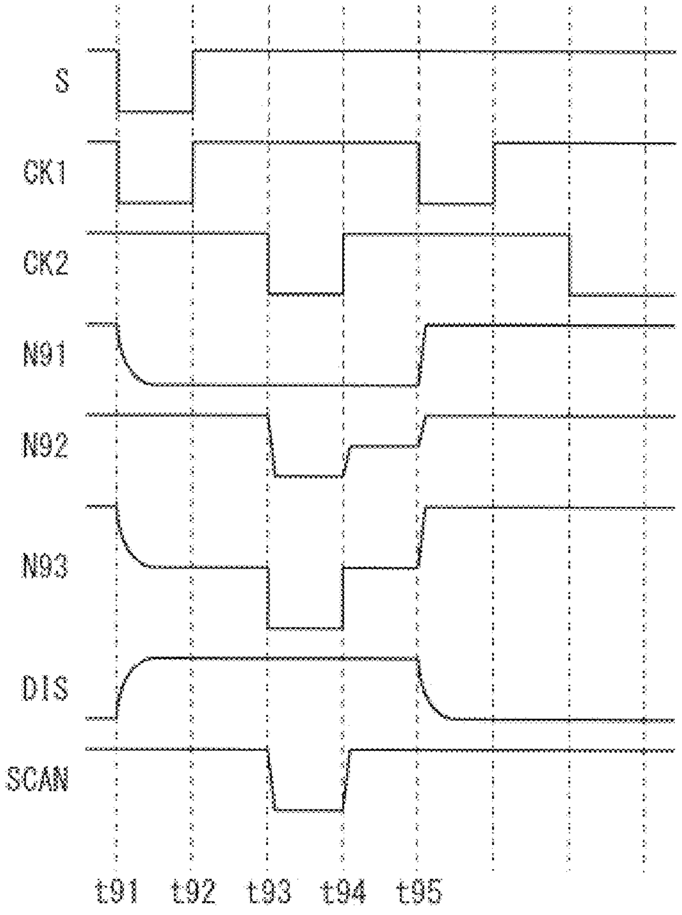

DISPLAY DEVICE

TECHNICAL FIELD

The following disclosure relates to a display device including an initialization control circuit that controls initialization of pixel circuits and a write control circuit that controls writing of data signals to the pixel circuits.

BACKGROUND ART

In recent years, an organic EL display device including pixel circuits each including an organic EL element has been put to practical use. The organic EL element is also called an organic light-emitting diode (OLED), and is a self-emissive display element that emits light at luminance determined based on a current flowing therethrough. Since the organic EL element is thus a self-emissive display element, the organic EL display device can easily achieve slimming down, a reduction in power consumption, an increase in luminance, etc., compared to a liquid crystal display device that requires a backlight, a color filter, and the like. Thus, in recent years, development of organic EL display devices has been actively pursued.

In a display unit of an organic EL display device there are disposed various types of control signal lines for controlling operation of pixel circuits. For example, in an organic EL display device that adopts an internal compensation scheme a scheme for compensating for variations in characteristics of drive transistors in pixel circuits, there are disposed, in a display unit, a plurality of types of horizontal scanning lines such as write control lines for controlling writing of data signals to the pixel circuits, and initialization control lines for initializing the internal states of the pixel circuits. A drive circuit that drives the plurality of types of horizontal scanning lines is provided in a picture-frame region. Note that in this specification, a drive circuit including an initialization control circuit that drives the initialization control lines and a write control circuit that drives the write control lines is referred to as "gate driver".

Meanwhile, refresh rate (frame frequency) of a general display device is 60 Hz. However, in recent years, for the purpose of improvement of display quality of a moving image, etc., an increase in refresh rate has been pursued. Regarding this, if the refresh rate increases, then the length of one frame period decreases and thus the length of one horizontal scanning period naturally decreases. This results in reducing a period of time that can be allocated as time for charging source bus lines (date signal lines) that transmit data signals and as time for charging pixel circuits. According to a general driving technique, as shown in FIG. 27, one horizontal scanning period (1H) includes a transition period T901 for switching data; a source bus line charging period T902; and a pixel circuit charging period (a period during which writing of a data signal to a pixel circuit is performed such that variations in characteristics of a drive transistor are compensated for) T903. Note that for FIG. 27, GCK1 and GCK2 indicate gate clock signals which are provided to the drive circuit, and SL indicates a data signal applied to the source bus line. In this example, a rise time point of the gate clock signal GCK1 is a start time point of the horizontal scanning period, and writing of a data signal to a pixel circuit is performed during a period during which the gate clock signal GCK2 is maintained at low level. When trying to make one horizontal scanning period as short as possible in a given organic EL display device, for example, the transition period T901 is 0.4 microseconds, the source bus line charging period T902 is 1.10 microseconds, and the pixel circuit charging period T903 is 1.10 microseconds. Considering this, for example, in a case of a full high-definition (FHD) organic EL display device, the refresh rate can only be increased to about 160 Hz at maximum.

Hence, adoption of a scheme (hereinafter, referred to as "double-source scheme") is considered in which two source bus lines (a source bus line connected to pixel circuits in odd-numbered rows and a source bus line connected to pixel circuits in even-numbered rows) are provided for each column of pixel circuits that are arranged side by side in a direction in which the source bus lines extend (vertical device direction), and charging of the source bus lines and charging of the pixel circuits are performed over two horizontal scanning periods.

FIG. 28 is a circuit diagram for describing the double-source scheme. In FIG. 28, four pixel circuits given reference characters 91*a*, 91*b*, 91*c*, and 91*d* are taken a look at. As can be grasped from FIG. 28, one output terminal of a source driver (data signal line drive circuit) corresponds to two source bus lines SL. One of the two source bus lines SL is connected to a pixel circuit in an odd-numbered row and the other one of the two source bus lines SL is connected to a pixel circuit in an even-numbered row. A demultiplexer is provided between each output terminal of the source driver and corresponding two source bus lines SL. Each demultiplexer includes two connection control transistors. In a configuration shown in FIG. 28, when a control signal ASW1 is at low level and a control signal ASW2 is at high level, a connection control transistor 921*a* and a connection control transistor 921*c* are in on state, by which data signals outputted from the source driver are applied to a source bus line SL connected to the pixel circuit 91*a* and a source bus line SL connected to the pixel circuit 91*c*. When the control signal ASW1 is at high level and the control signal ASW2 is at low level, a connection control transistor 921*b* and a connection control transistor 921*d* are in on state, by which data signals outputted from the source driver are applied to a source bus line SL connected to the pixel circuit 91*b* and a source bus line SL connected to the pixel circuit 91*d*.

FIG. 29 is a waveform diagram for describing a driving technique for an organic EL display device that adopts the double-source scheme. Two horizontal scanning periods (2H) include a transition period T911 for switching data; a source bus line charging period T912; and a pixel circuit charging period T913. Here, for example, when attempting to achieve a refresh rate of 240 Hz in a full high-definition (FHD) organic EL display device, the length of the two horizontal scanning periods is about 3.30 microseconds at minimum. In this case, it is possible to set, for example, the transition period T911 to 0.4 microseconds, the source bus line charging period T912 to 1.40 microseconds, and the pixel circuit charging period T913 to 1.50 microseconds. By thus adopting the double-source scheme, it becomes possible to perform high-speed driving while ensuring the source bus line charging period and the pixel circuit charging period sufficiently.

Note that in relation to this application, the following related art documents are known. Japanese Laid-Open Patent Publication No. 2006-107566 discloses a configuration of a shift register that can increase an output signal (sampling signal) to three output signals for every increase of two unit circuits. According to this shift register, the number of stages can be consequently reduced and thus the area of a circuit decreases. Further, Japanese Laid-Open Patent Publication No. 2007-086728 discloses a configuration of a drive circuit that drives a plurality of types of horizontal scanning lines, regarding an organic EL display device.

CITATION LIST

Patent Documents

[Patent Document 1] Japanese Laid-Open Patent Publication No. 2006-107566
[Patent Document 2] Japanese Laid-Open Patent Publication No. 2007-086728

SUMMARY

Problems to be Solved by the Invention

Meanwhile, when high-speed driving (e.g., refresh rate: 240 Hz) is implemented by adopting the above-described double-source scheme, odd-numbered horizontal scanning lines and even-numbered horizontal scanning lines are driven by different drive circuits. Hence, drive circuits of a plurality of systems need to be provided for each side of the display unit. Specifically, there is a need to dispose, on both sides of the display unit, an initialization control circuit that drives odd-numbered initialization control lines; an initialization control circuit that drives even-numbered initialization control lines; a write control circuit that drives odd-numbered write control lines; and a write control circuit that drives even-numbered write control lines. Therefore, the area of a picture frame remarkably increases. In addition, since the number of circuit elements to be used increases, the possibility of occurrence of failures increases and thus there is concern about a reduction in reliability.

An object of the following disclosure is therefore to implement a display device that can increase the refresh rate while suppressing an increase in the area of a picture frame and a reduction in reliability.

Means for Solving the Problems

A display device according to some embodiments of the present disclosure is a display device including a plurality of pixel circuits each including a display element driven by a current, the display device including:

a display unit including a plurality of write control lines extending in a first direction; a plurality of initialization control lines extending in the first direction; a plurality of data signal lines extending in a second direction orthogonal to the first direction; and the plurality of pixel circuits each provided corresponding to at least one of the plurality of write control lines, one of the plurality of initialization control lines, and one of the plurality of data signal lines;

a data signal line drive circuit configured to apply a data signal to the plurality of data signal lines;

a write control circuit configured to apply a write control signal to the plurality of write control lines, the write control signal controlling writing of the data signal to a pixel circuit; and an initialization control circuit configured to apply an initialization signal to the plurality of initialization control lines, the initialization signal controlling initialization of a pixel circuit, wherein a first picture-frame region and a second picture-frame region are provided outside the display unit, as regions for disposing the write control circuit and the initialization control circuit, the first picture-frame region being near a one-edge side of the display unit regarding the first direction, and the second picture-frame region being near an other-edge side of the display unit regarding the first direction, the write control circuit includes:

a first write control circuit disposed in the first picture-frame region and configured to apply the write control signal to even-numbered write control lines;

a second write control circuit disposed in the second picture-frame region and configured to apply the write control signal to even-numbered write control lines;

a third write control circuit disposed in the first picture-frame region and configured to apply the write control signal to odd-numbered write control lines; and a fourth write control circuit disposed in the second picture-frame region and configured to apply the write control signal to the odd-numbered write control lines, the initialization control circuit includes:

a first initialization control circuit disposed in the first picture-frame region and configured to apply the initialization signal to even-numbered initialization control lines; and a second initialization control circuit disposed in the second picture-frame region and configured to apply the initialization signal to odd-numbered initialization control lines, a first unit circuit constituting each stage of a shift register included in each of the first write control circuit, the second write control circuit, the third write control circuit, and the fourth write control circuit corresponds to one of the plurality of write control lines, the first unit circuit includes a plurality of transistors, the plurality of transistors included in the first unit circuit are all thin-film transistors having a channel layer formed of low-temperature polysilicon, a second unit circuit constituting each stage of a shift register included in each of the first initialization control circuit and the second initialization control circuit corresponds to one of the plurality of initialization control lines, one clock signal of multi-phase clock signals is provided as a first input clock signal to the second unit circuit, and the second unit circuit captures a value of a shift signal based on a pulse of the first input clock signal, holds the value internally until a next pulse of the first input clock signal occurs, and applies the initialization signal to a corresponding initialization control line based) on the value held internally.

Effects of the Invention

According to some embodiments of the present disclosure, in order to drive even-numbered initialization control lines from only a one-edge side of a display unit and drive odd-numbered initialization control lines from only an other-edge side of the display unit, an initialization control circuit is composed of a first initialization control circuit provided in a first picture-frame region to apply initialization signals to the even-numbered initialization control lines; second initialization control circuit provided in a second picture-frame region to apply initialization signals to the odd-numbered initialization control lines. Since such a configuration is adopted, it becomes possible to reduce the area of a picture frame and increase the margin of the picture-frame regions, compared to a configuration in which each initialization control line is driven from both the one-edge side of the display unit and the other-edge side thereof. Meanwhile, a second unit circuit that constitutes each stage of a shift register that implements the initialization control circuit has a latch function and drives an initialization control line based on a value held internally. By this, the pulse width of the initialization applied to the initialization control line is signal relatively long. Therefore, even if the waveform of the initialization signal is rounded due to each initialization control line being driven from only either one of the one-edge side of the display unit and the other-edge side thereof, there is almost no influence on driving operation. In addition, compared to the configuration in which each initialization control line is driven from both the one-edge side of the display unit and the other-edge side thereof, the number of circuit elements for the initialization control circuit decreases, and thus, the possibility of occurrence of failures decreases, improving reliability. Furthermore, transistors included in a first unit circuit that constitutes each stage of a shift register that implements a write control circuit are all thin-film transistors having a channel layer formed of low-temperature polysilicon, and each write control line is driven from both the one-edge side of the display unit and the other-edge side thereof, and thus, even if a high refresh rate is adopted, sufficient reliability is acquired for writing of data signals to pixel circuits. As above, a display device is implemented that can increase the refresh rate while suppressing an increase in the area of a picture frame and a reduction in reliability.

BRIEF DESCRIPTION OF THE DRAWINGS

FIG. 30 is an overall schematic configuration diagram of gate drivers in a comparative example.

FIG. 31 is a circuit diagram of a unit circuit in the comparative example.

FIG. 32 is a waveform diagram for describing operation of the unit circuit in the comparative example.

MODES FOR CARRYING OUT THE INVENTION

0. Comparative Example

Figure 1:
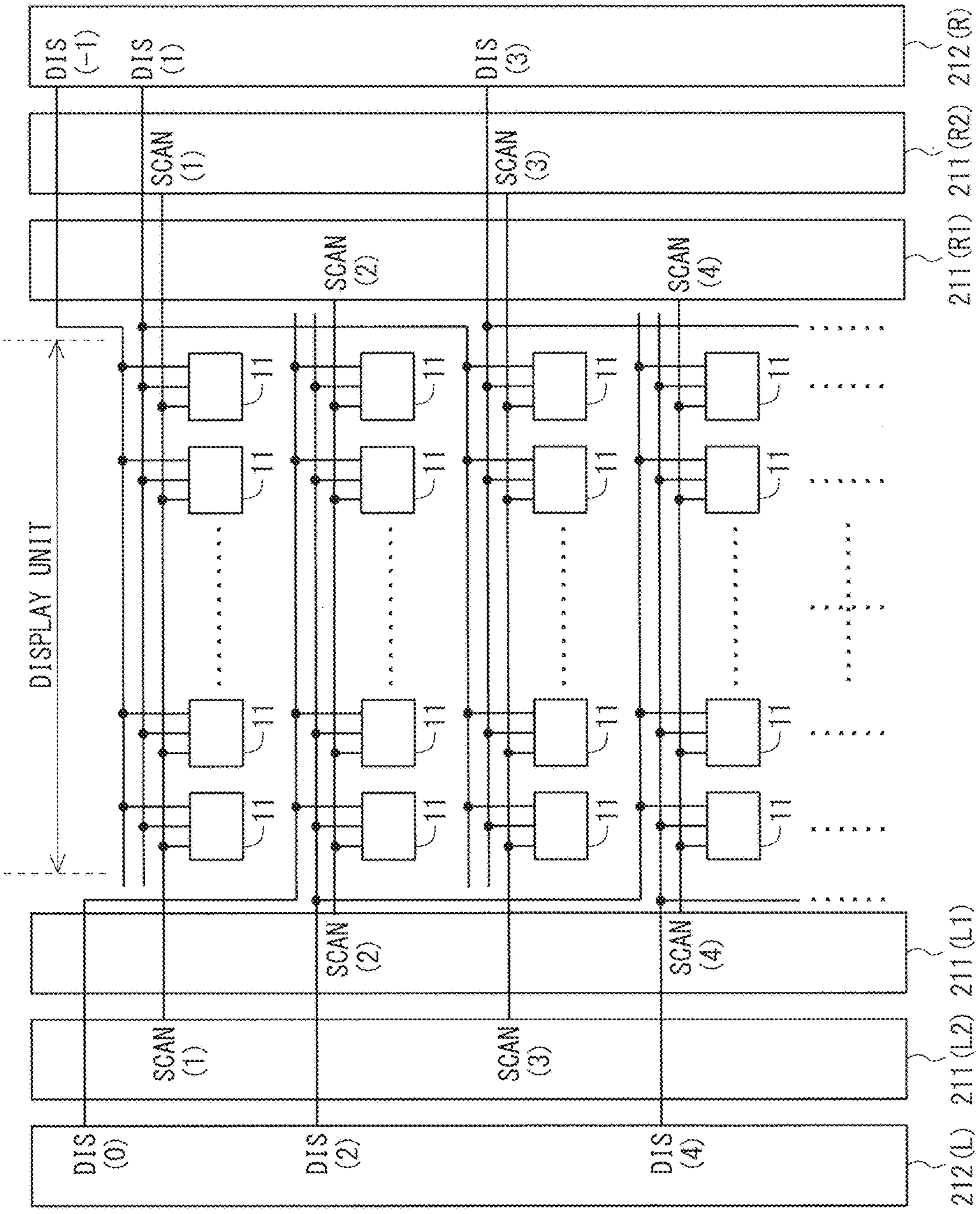
FIG. 1 is an overall schematic configuration diagram of gate drivers in a first embodiment.

Before describing embodiments, a comparative example will be described. A configuration of the comparative example described here is a general configuration that is considered when high-speed driving is implemented by adopting the double-source scheme. FIG. 30 is an overall schematic configuration diagram of gate drivers in the comparative example. Circuits that constitute gate drivers are disposed on both sides of a display unit including a plurality of pixel circuits 91 provided in matrix state. Note that in the following description, a picture-frame region located on the left side of the display unit in the drawing is referred to as "first picture-frame region" and a picture-frame region located on the right side of the display unit in the drawing is referred to as "second picture-frame region".

Each gate driver is composed of write control circuits given reference characters starting with 911 in FIG. 30; and initialization control circuits given reference characters starting with 912 in FIG. 30. In the first picture-frame region there are disposed a write control circuit 911(L1) that applies write control signals SCAN to even-numbered write control lines; a write control circuit 911(L2) that applies write control signals SCAN to odd-numbered write control lines; an initialization control circuit 912(L1) that applies initialization signals DIS to even-numbered initialization control lines; and an initialization control circuit 912(L2) that applies initialization signals DIS to odd-numbered initialization control lines. In the second picture-frame region there are disposed a write control circuit 911(R1) that applies write control signals SCAN to the even-numbered write control lines; a write control circuit 911(R2) that applies write control signals SCAN to the odd-numbered write control lines; an initialization control circuit 912(R1) that applies initialization signals DIS to the even-numbered initialization control lines; and an initialization control circuit 912(R2) that applies initialization signals to the odd-numbered DIS initialization control lines. In both the first picture-frame region and the second picture-frame region, the write control circuits 911 of two systems and the initialization control circuits 912 of two systems are thus disposed. By a configuration such as that described above, all write control lines are driven from both the one-edge side of the display unit and the other-edge side thereof, and all initialization control lines are driven from both the one-edge side of the display unit and the other-edge side thereof.

In the comparative example, the write control circuit 911(L1) and the initialization control circuit 912(L1) are implemented by one shift register, the write control circuit 911(L2) and the initialization control circuit 912(L2) are implemented by one shift register, the write control circuit 911(R1) and the initialization control circuit 912(R1) are implemented by one shift register, and the write control circuit 911(R2) and the initialization control circuit 912(R2) are implemented by one shift register. FIG. 31 is a circuit diagram of a unit circuit 900 that constitutes each stage of those shift registers. A portion given reference character 901 in FIG. 31 is a circuit portion that constitutes the write control circuit 911, and a portion given reference character 902 in FIG. 31 is a circuit portion that constitutes the initialization control circuit 912.

As shown in FIG. 31, the unit circuit 900 is composed of 10 transistors M90 to M99 and one capacitor C91. The transistors M90 and M95 are thin-film transistors having a channel layer formed of an oxide semiconductor containing indium, gallium, zinc, and oxygen (hereinafter, referred to as "IGZO-TFTs"). The transistors M91 to M94 and M96 to M99 are thin-film transistors having a channel layer formed of low-temperature polysilicon (hereinafter, referred to as "LTPS-TFTs"). The unit circuit 900 also has three input terminals 92 to 94 and two output terminals 98 and 99 in addition to an input terminal to which a high-level power supply voltage VGH is provided and an input terminal to which a low-level power supply voltage VGL is provided.

A write control signal SCAN is outputted from the output terminal 98 and an initialization signal DIS is outputted from the output terminal 99. Note that the write control signal SCAN outputted from the output terminal 98 is also provided as a shift signal S to a unit circuit 900 of a subsequent stage. A shift signal S is provided to the input terminal 92 and clock signals are provided to the input terminal 93 and the input terminal 94. The clock signal provided to the input terminal 93 is hereinafter referred to as "first input clock signal" and the clock signal provided to the input terminal 94 is hereinafter referred to as "second input clock signal". The first input clock signal is given reference character CK1 and the second input clock signal is given reference character CK2. The second input clock signal CK2 is delayed in phase by 180 degrees relative to the first input clock signal CK1.

Next, with reference to FIG. 32, the operation of the unit circuit 900 will be described. At a point in time immediately before time t91, the shift signal S is at high level, the first input clock signal CK1 is at high level, the second input clock signal CK2 is at high level, the potential at a first internal node N91 is at high level, the potential at a second internal node N92 is at high level, the potential at a third internal node N93 is at high level, the initialization signal DIS is at low level, and the write control signal SCAN is at high level.

At time t91, the shift signal S changes from high level to low level and the first input clock signal CK1 changes from high level to low level. By this, the transistor M92 goes into on state, by which the potentials at the first internal node N91 and the third internal node N93 decrease. By the decrease in the potential at the first internal node N91, the transistor M93 goes into on state and the transistor M95 goes into off state. By this, the transistor M94 and the transistor M97 go into off state. In addition, by the decrease in the potential at the third internal node N93, the transistor M98 goes into on state. However, during a period from time t91 to time t92, the second input clock signal CK2 is maintained at high level, and thus, the potential at the output terminal 98 (the potential of the write control signal SCAN) is maintained at high level. In addition, at time t91, the transistor M99 goes into on state and the transistor M90 goes into off state. By this, the potential at the output terminal 99 (the potential of the initialization signal DIS) changes from low level to high level.

During a period from time t92 to time t93, as with the period from time t91 to time t92, the second input clock signal CK2 is maintained at high level. Thus, during the period from time t92 to time t93, the potential at the output terminal 98 (the potential of the write control signal SCAN) is maintained at high level.

At time t93, the second input clock signal CK2 changes from high level to low level. At this time, the transistor M98 is in on state, and thus, the potential at the output terminal 98 (the potential of the write control signal SCAN) decreases with a decrease in the potential at the input terminal 94. Here, since the capacitor C91 is provided between the third internal node N93 and the output terminal 98, the potential at the third internal node N93 also decreases with the decrease in the potential at the output terminal 98. As a result, a large negative voltage is applied to a control terminal of the transistor M98, by which the potential at the output terminal 98 (the potential of the write control signal SCAN) sufficiently decreases. Note that during a period from time t93 to time t94, the transistor M96 goes into off state, by which the potential at the first internal node N91 is maintained at a potential obtained before time t93. In addition, at time t93, the transistor M91 goes into on state. By this, the potential at the second internal node N92 decreases.

At time t94, the second input clock signal CK2 changes from low level to high level. By this, the potential at the output terminal 98 (the potential of the write control signal SCAN) increases with an increase in the potential at the input terminal 94. When the potential at the output terminal 98 increases, the potential at the third internal node N93 also increases through the capacitor C91. By this, the transistor M96 goes into on state.

At time t95, the first input clock signal CK1 changes from high level to low level. By this, the transistor M92 goes into on state. At this time, since the shift signal S is at high level, the potentials at the first internal node N91 and the third internal node N93 increase. By the increase in the potential at the third internal node N93, the transistor M98 goes into off state. In addition, by the increase in the potential at the first internal node N91, the transistor M93 goes into off state and the transistor M95 goes into on state. By this, the transistor M94 and the transistor M97 go into on state. By the transistor M94 going into on state, the potential at the second internal node N92 increases. In addition, at time t95, the transistor M99 goes into off state and the transistor M90 goes into on state. By this, the potential at the output terminal 99 (the potential of the initialization signal DIS) changes from high level to low level.

During a period after time t95, as with the point in time immediately before time t91, the shift signal S is maintained at high level, the potentials at the first internal node N91, the second internal node N92, and the third internal node N93 are maintained at high level, the initialization signal DIS is maintained at low level, and the write control signal SCAN is maintained at high level.

By each unit circuit 900 performing operation such as that described above, initialization of each pixel circuit 91 in the display unit and writing of a data signal to each pixel circuit 91 in the display unit are performed.

According to the comparative example such as that described above, each unit circuit 900 is provided with two IGZO-TFTs. In addition, in both the first picture-frame region and the second picture-frame region, the write control circuits 911 of two systems and the initialization control circuits 912 of two systems are disposed. Accordingly, multiple IGZO-TFTs are used. Since the IGZO-TFT has low mobility compared to the LTPS-TFT, when multiple IGZO-TFTs are used as in the comparative example, sufficient reliability may not be obtained upon performing high-speed driving.

With reference to the accompanying drawings, embodiments will be described below. Note that although three terminals of a TFT are generally called “gate”, “drain”, and “source”, since the drain and the source may be switched in the following embodiments, the gate is referred to as “control terminal” and two terminals that serve as the drain or the source are referred to as “first conductive terminal” and “second conductive terminal”.

1. First Embodiment

<1.1 Overall Configuration and Overview of Operation>

Figure 2:
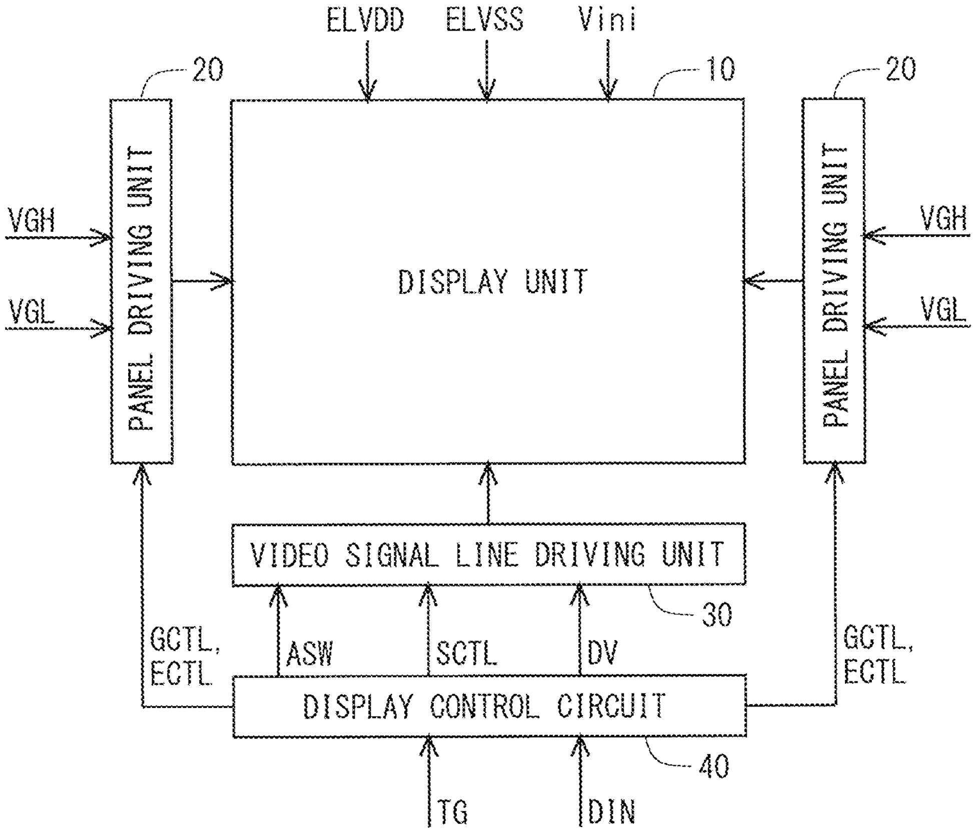
FIG. 2 is a block diagram showing an overall configuration of an organic EL display device according to the first embodiment.

FIG. 2 is a block diagram showing an overall configuration of an organic EL display device according to a first embodiment. As shown in FIG. 2, the organic EL display device includes a display unit 10, panel driving units 20, a video signal line driving unit 30, and a display control circuit 40. The panel driving units 20 are provided on both the left-edge side of the display unit 10 and the right-edge side thereof. That is, the panel driving units 20 are provided in both the first picture-frame region and the second picture-frame region. Note that the organic EL display device according to the present embodiment adopts the aforementioned double-source scheme.

A plurality of pixel circuits are provided in the display unit 10. The plurality of pixel circuits form a pixel matrix of a plurality of rows×a plurality of columns. In the display unit 10 there are also disposed a plurality of write control lines, a plurality of initialization control lines, a plurality of light-emission control lines, and a plurality of source bus lines (data signal lines). The write control lines, the initialization control lines, and the light-emission control lines extend in a horizontal scanning direction, and the source bus lines extend in a vertical scanning direction. In the following description, the write control lines and write control signals applied thereto are given reference character SCAN, the initialization control lines and initialization signals applied thereto are given reference character DIS, the light-emission control lines and light-emission control signals applied thereto are given reference character EM, and the source bus lines and data signals applied thereto are given reference character SL. Note that the horizontal scanning direction corresponds to a first direction and the vertical scanning direction corresponds to a second direction.

In the display unit 10 there are further disposed power lines that are shared between the plurality of pixel circuits. More specifically, there are disposed a power line that supplies a high-level power supply voltage ELVDD for driving organic EL elements, a power line that supplies a low-level power supply voltage ELVSS for driving the organic EL elements, and a power line that supplies an initialization voltage Vini. Meanwhile, in each of the first picture-frame region and the second picture-frame region there are disposed a power line that supplies a high-level power supply voltage VGH for the panel driving unit 20 and a power line that supplies a low-level power supply voltage VGL for the panel driving unit 20. Hence, to distinguish between those power lines, the power line that supplies the high-level power supply voltage ELVDD is referred to as “first high-level power line”, the power line that supplies the low-level power supply voltage ELVSS is referred to as “first low-level power line”, the power line that supplies the high-level power supply voltage VGH is referred to as “second high-level power line”, the power line that supplies the low-level power supply voltage VGL is referred to as “second low-level power line”, and the power line that supplies the initialization voltage Vini is referred to as “initialization power line”.

Figure 3:
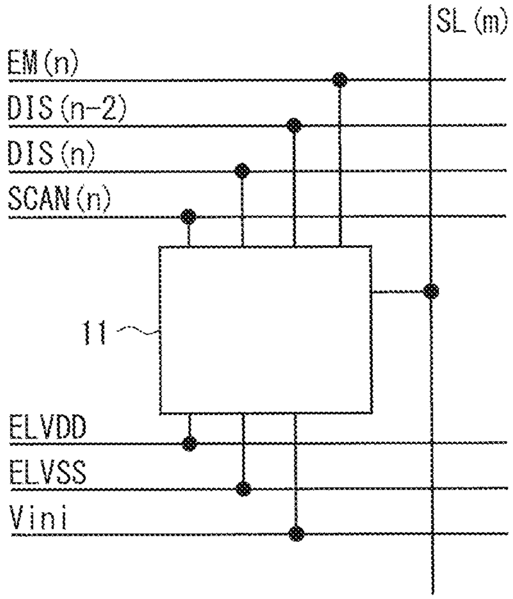
FIG. 3 is a diagram showing a connection relationship between a pixel circuit and various types of wiring lines in the first embodiment.

FIG. 3 is a diagram showing a connection relationship between a pixel circuit 11 and various types of wiring lines. Note that the pixel circuit 11 shown in FIG. 3 is a pixel circuit 11 corresponding to an nth write control line SCAN(n) and an mth source bus line SL(m). The pixel circuit 11 is connected to the nth write control line SCAN(n), an nth initialization control line DIS(n), an (n−2)th initialization control line DIS(n−2), an nth light-emission control line EM(n), the mth source bus line SL(m), the first high-level power line, the first low-level power line, and the initialization power line.

Figure 4:
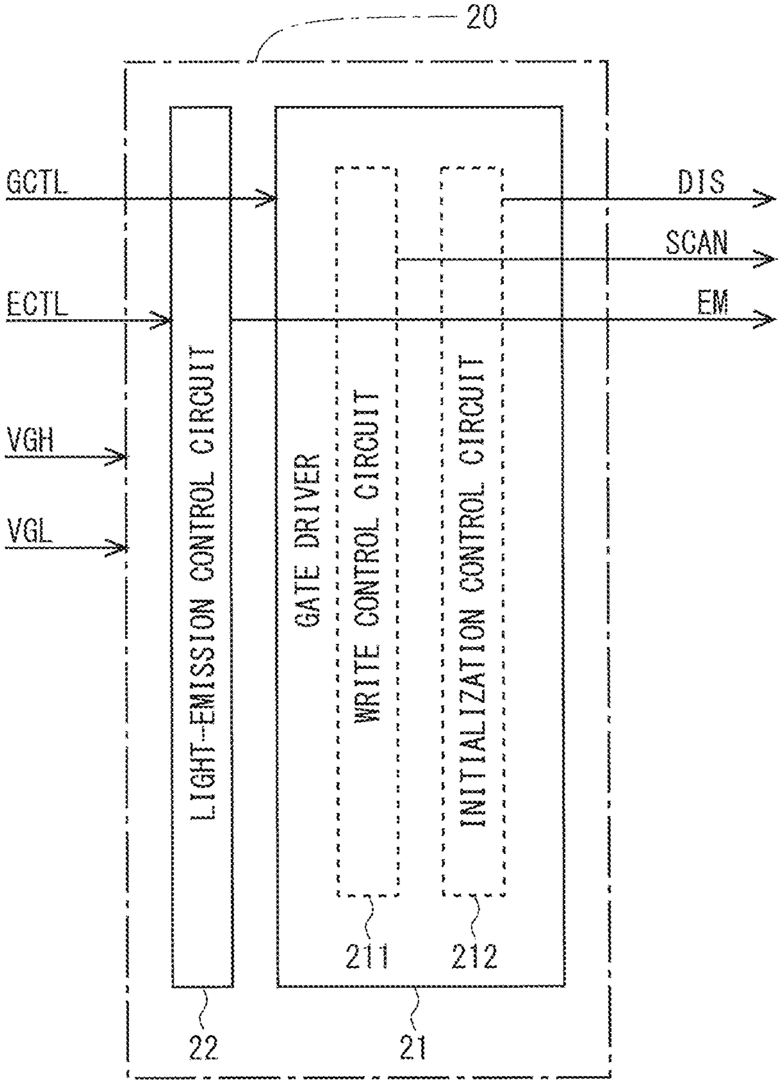
FIG. 4 is a block diagram showing an internal functional configuration of a panel driving unit in the first embodiment.

FIG. 4 is a block diagram showing an internal functional configuration of the panel driving unit 20. Note that since the panel driving unit 20 provided in the first picture-frame region and the panel driving unit 20 provided in the second picture-frame region have the same configuration, in this specification, description is made taking a look at the panel driving unit 20 provided in the first picture-frame region. As shown in FIG. 4, the panel driving unit 20 includes a gate driver 21 that drives the write control lines SCAN and the initialization control lines DIS; and a light-emission control circuit (emission driver) 22 that drives the light-emission control lines EM. The gate driver 21 includes a write control circuit 211 that drives the write control lines SCAN; and an initialization control circuit 212 that drives the initialization control lines DIS.

Operation of each component shown in FIGS. 2 and 4 will be described below. The display control circuit 40 receives an input image signal DIN and a timing signal group (a horizontal synchronizing signal, a vertical synchronizing signal, etc.) TG that are sent from an external source, and outputs digital video signals DV, control signals GCTL that control operation of the gate drivers 21 in the panel driving units 20, control signals ECTL that control operation of the light-emission control circuits 22 in the panel driving units 20, and control signals SCTL and ASW that control operation of the video signal line driving unit 30.

The write control circuits 211 in the panel driving units 20 apply write control signals SCAN to the plurality of write control lines, based on the control signals GCTL outputted from the display control circuit 40. The initialization control circuits 212 in the panel driving units 20 apply initialization signals DIS to the plurality of initialization control lines, based on the control signals GCTL outputted from the display control circuit 40. The light-emission control circuits 22 in the panel driving units 20 apply light-emission control signals EM to the plurality of light-emission control lines, based on the control signals ECTL outputted from the display control circuit 40. The video signal line driving unit 30 applies data signals to the plurality of source bus lines, based on the digital video signals DV and control signals SCTL and ASW outputted from the display control circuit 40. Note that a detailed description write control circuits 211, the initialization control circuits 212, and the video signal line driving unit 30 will be made later.

By applying the write control signals SCAN to the plurality of write control lines, applying the initialization signals DIS to the plurality of initialization control lines, applying the light-emission control signals EM to the plurality of light-emission control lines, and applying the data signals to the plurality of source bus lines in the above-described manner, an image based on the input image signal DIN is displayed on the display unit 10.

<1.2 Configuration and Operation of the Pixel Circuits>

Figure 5:
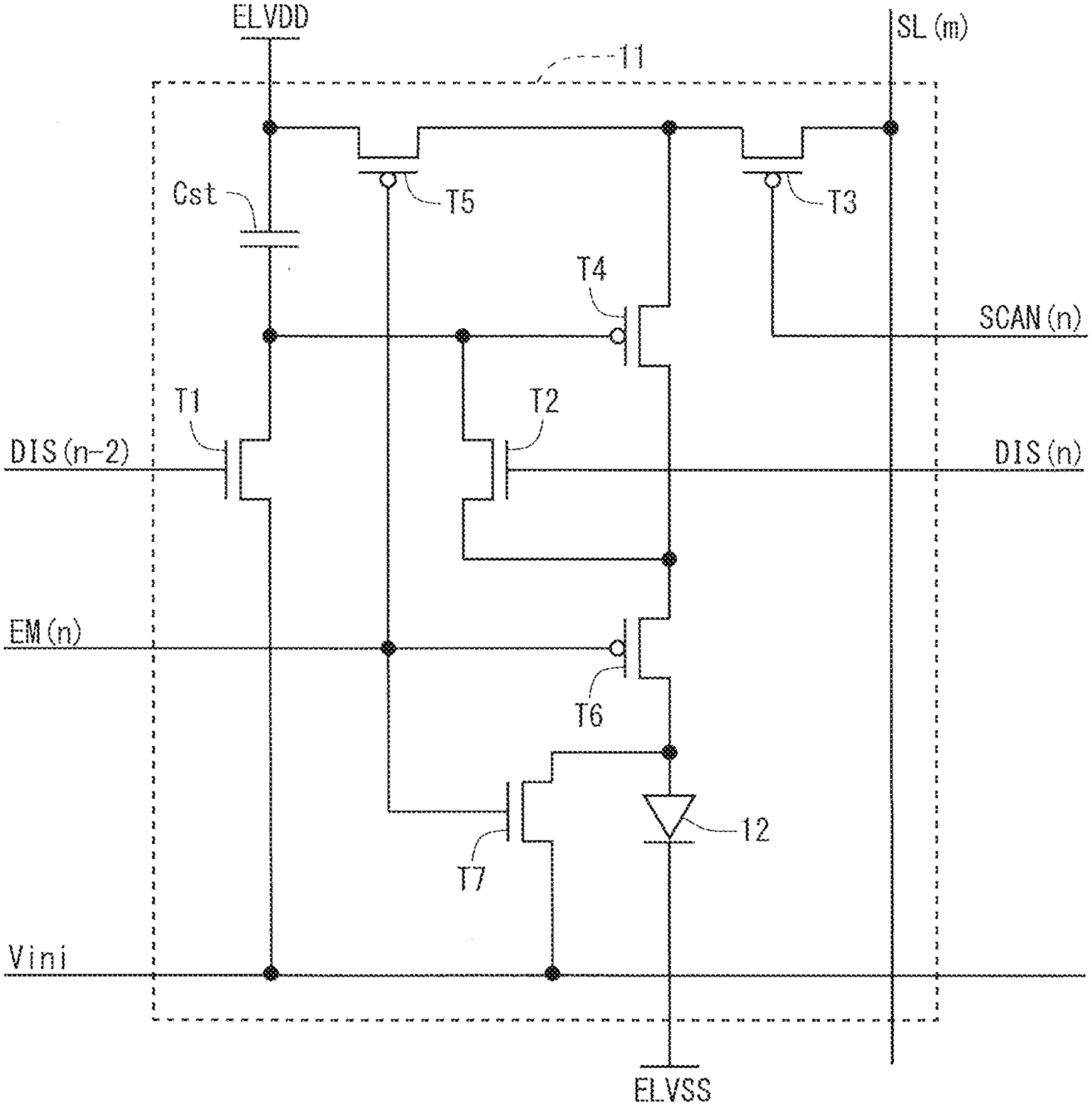
FIG. 5 is a circuit diagram showing a configuration of a pixel circuit in the first embodiment.

Next, a configuration of the pixel circuit 11 in the display unit 10 will be described. FIG. 5 is a circuit diagram showing a configuration of a pixel circuit 11 corresponding to an nth write control line SCAN(n) and an mth source bus line SL(m). The pixel circuit 11 includes one organic EL element (organic light-emitting diode) 12 serving as a display element (a display element driven by a current); seven transistors T1 to T7 (a first initialization transistor T1, a threshold voltage compensation transistor T2, a write control transistor T3, a drive transistor T4, a power supply control transistor T5, a light-emission control transistor T6, and a second initialization transistor T7); and one holding capacitor Cst. The holding capacitor Cst is a capacitive element including two electrodes (a first electrode and a second electrode). The first initialization transistor T1, the threshold voltage compensation transistor T2, and the second initialization transistor T7 are N-channel type IGZO-TFTs. The write control transistor T3, the drive transistor T4, the power supply control transistor T5, and the light-emission control transistor T6 are P-channel type LTPS-TFTs. Note that a configuration that does not have the second initialization transistor T7 can also be adopted.

The first initialization transistor T1 is connected at its control terminal to an (n−2)th initialization control line DIS(n−2), connected at its first conductive terminal to a second conductive terminal of the threshold voltage compensation transistor T2, a control terminal of the drive transistor T4, and the first electrode of the holding capacitor Cst, and connected at its second conductive terminal to an initialization power line. The threshold voltage compensation transistor T2 is connected at its control terminal to an nth initialization control line DIS(n), connected at its first conductive terminal to a second conductive terminal of the drive transistor T4 and a first conductive terminal of the light-emission control transistor T6, and connected at its second conductive terminal to the first conductive terminal of the first initialization transistor T1, the control terminal of the drive transistor T4, and the first electrode of the holding capacitor Cst. The write control transistor T3 is connected at its control terminal to the nth write control line SCAN(n), connected at its first conductive terminal to the mth source bus line SL(m), and connected at its second conductive terminal to first conductive terminal of the drive transistor T4 and a second conductive terminal of the power supply control transistor T5. The drive transistor T4 is connected at its control terminal to the first conductive terminal of the first initialization transistor T1, the second conductive terminal of the threshold voltage compensation transistor T2, and the first electrode of the holding capacitor Cst, connected at its first conductive terminal to the second conductive terminal of the write control transistor T3 and the second conductive terminal of the power supply control transistor T5, and connected at its second conductive terminal to the first conductive terminal of the threshold voltage compensation transistor T2 and the first conductive terminal of the light-emission control transistor T6.

The power supply control transistor T5 is connected at its control terminal to an nth light-emission control line EM(n), connected at its first conductive terminal to a first high-level power line and the second electrode of the holding capacitor Cst, and connected at its second conductive terminal to the second conductive terminal of the write control transistor T3 and the first conductive terminal of the drive transistor T4. The light-emission control transistor T6 is connected at its control terminal to the nth light-emission control line EM(n), connected at its first conductive terminal to the first conductive terminal of the threshold voltage compensation transistor T2 and the second conductive terminal of the drive transistor T4, and connected at its second conductive terminal to a first conductive terminal of the second initialization transistor T7 and an anode terminal of the organic EL element 12. The second initialization transistor T7 is connected at its control terminal to the nth light-emission control line EM(n), connected at its first conductive terminal to the second conductive terminal of the light-emission control transistor T6 and the anode terminal of the organic EL element 12, and connected at its second conductive terminal to the initialization power line. The holding capacitor Cst is connected at its first electrode to the first conductive terminal of the first initialization transistor T1, the second conductive terminal of the threshold voltage compensation transistor T2, and the control terminal of the drive transistor T4, and connected at its second electrode to the first high-level power line and the first conductive terminal of the power supply control transistor T5. The organic EL element 12 is connected at its anode terminal (first terminal) to the second conductive terminal of the light-emission control transistor T6 the and first conductive terminal of the second initialization transistor T7, and connected at its cathode terminal (second terminal) to a first low-level power line.

Figure 6:
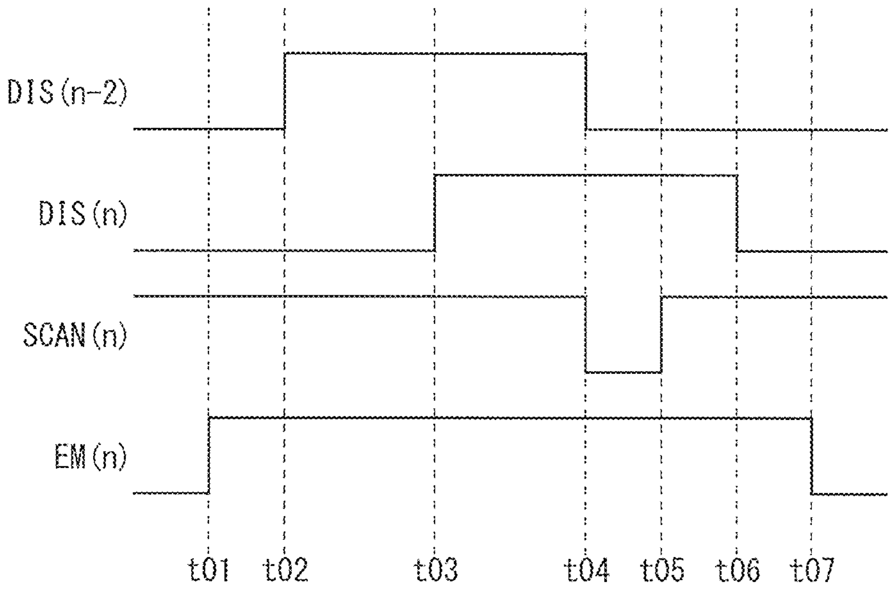
FIG. 6 is a timing chart for describing operation of the pixel circuit in the first embodiment.

Next, operation of the pixel circuit 11 will be described. FIG. 6 is a timing chart for describing operation of the pixel circuit 11 shown in FIG. 5. Note that for FIG. 6, a period before time t01 and a period after time t07 are light-emission periods, and a period from time t01 to t07 is a turn-off period.

At a point in time immediately before time t01, the write control signal SCAN(n) is at high level and the initialization signal DIS(n−2), the initialization signal DIS(n), and the light-emission control signal EM(n) are at low level. At this time, the power supply control transistor T5 and the light-emission control transistor T6 are in on state, and the organic EL element 12 emits light depending on the magnitude of a drive current.

At time t01, the light-emission control signal EM(n) changes from low level to high level. By this, the power supply control transistor T5 and the light-emission control transistor T6 go into off state. As a result, the supply of the current to the organic EL element 12 is interrupted, by which the organic EL element 12 goes into turn-off state. In addition, the second initialization transistor T7 goes into on state. By this, the anode voltage of the organic EL element 12 is initialized based on the initialization voltage Vini.

At time t02, the initialization signal DIS(n−2) changes from low level to high level. By this, the first initialization transistor T1 goes into on state. As a result, the voltage at the control terminal of the drive transistor T4 is initialized. That is, the voltage at the control terminal of the drive transistor T4 becomes substantially equal to the initialization voltage Vini.

At time t03, the initialization signal DIS(n) changes from low level to high level. By this, the threshold voltage compensation transistor T2 goes into on state.

At time t04, the initialization signal DIS(n−2) changes from high level to low level. By this, the first initialization transistor T1 goes into off state. In addition, at time t04, the write control signal SCAN(n) changes from high level to low level. By this, the write control transistor T3 goes into on state. Since the threshold voltage compensation transistor T2 goes into on state at time t03, by the write control transistor T3 going into on state at time t04, a data signal SL(m) is provided to the first electrode of the holding capacitor Cst through the write control transistor T3, the drive transistor T4, and the threshold voltage compensation transistor T2. By this, the holding capacitor Cst is charged.

At time t05, the write control signal SCAN(n) changes from low level to high level. By this, the write control transistor T3 goes into off state.

At time t06, the initialization signal DIS(n) changes from high level to low level. By this, the threshold voltage compensation transistor T2 goes into off state.

At time t07, the light-emission control signal EM(n) changes from high level to low level. By this, the second initialization transistor T7 goes into off state. In addition, by the power supply control transistor T5 and the light-emission control transistor T6 going into on state, a drive current based on the charged voltage of the holding capacitor Cst is supplied to the organic EL element 12. As a result, the organic EL element 12 emits light depending on the magnitude of the drive current. Thereafter, the organic EL element 12 emits light throughout a period until the next time the light-emission control signal EM(n) changes from low level to high level.

As above, writing of a data signal to the pixel circuit 11 connected to the nth write control line SCAN(n) is performed by maintaining the write control signal SCAN(n) at low level (on level) for a predetermined period during a period from when the initialization signal DIS(n−2) changes from high level to low level until the initialization signal DIS(n) changes from high level to low level, after the initialization signal DIS(n−2) and the initialization signal DIS(n) sequentially change from low level (off level) to high level (on level).

<1.3 Configuration of the Video Signal Line Driving Unit>

Figure 7:
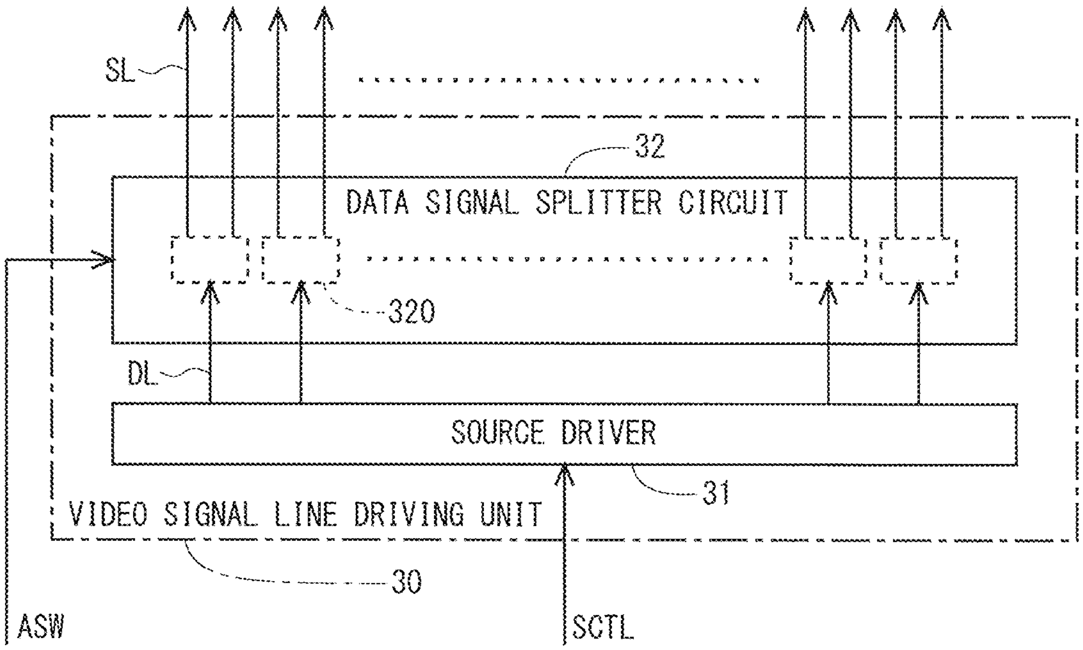
FIG. 7 is a block diagram showing a configuration of a video signal line driving unit in the first embodiment.

FIG. 7 is a block diagram showing a configuration of the video signal line driving unit 30. As described above, in the present embodiment, the double-source scheme is adopted. Therefore, as shown in FIG. 7, the video signal line driving unit 30 is composed of a source driver (data signal line drive circuit) 31 and a data signal splitter circuit 32. The source driver 31 and the data signal splitter circuit 32 are connected to each other by data output lines DL. The number of the data output lines DL is equal to the number of columns of the pixel matrix. Thus, the source driver 31 is provided with output terminals whose number is equal to the number of columns of the pixel matrix. The data signal splitter circuit 32 is provided with a plurality of demultiplexers (demultiplexers whose number is equal to the number of columns of the pixel matrix) 320 in such a way that the plurality of demultiplexers 320 have a one-to-one correspondence with the plurality of output terminals (the output terminals whose number is equal to the number of columns of the pixel matrix) provided in the source driver 31. In addition, in the display unit 10 there are disposed two source bus lines SL for each column of the pixel matrix, and each demultiplexer 320 switches connection destination of a data output line DL (connection destination of an output terminal of the source driver 31) between its corresponding two source bus lines SL, based on a control signal ASW. In order to implement this, each demultiplexer 320 includes two connection control transistors (not shown in FIG. 7). Note that a connection switching circuit is implemented by the demultiplexer 320.

Figure 8:
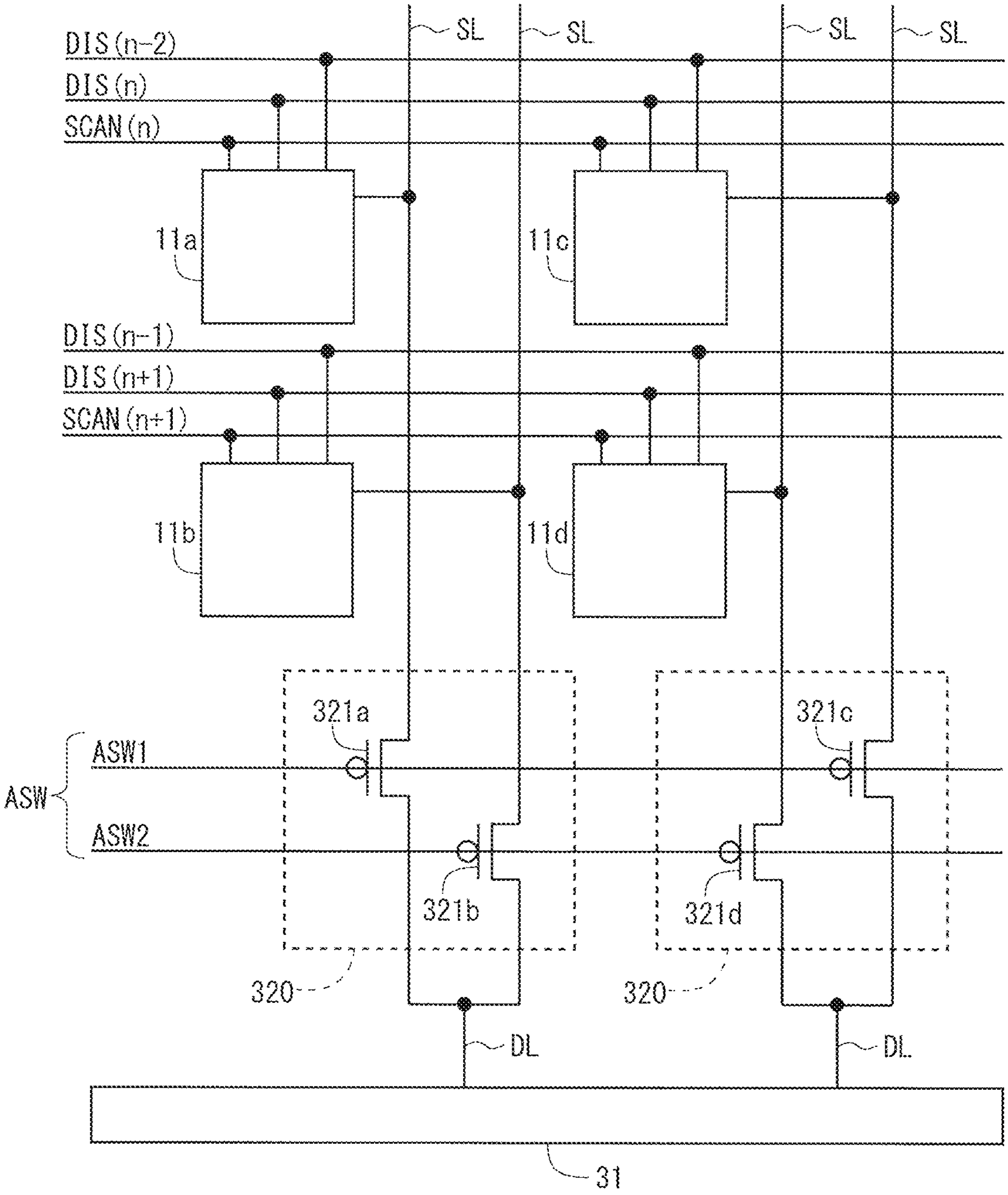
FIG. 8 is a circuit diagram for describing a relationship between four pixel circuits and demultiplexers in the first embodiment.

With reference to FIG. 8, a relationship between four pixel circuits 11*a* to 11*d* for two rows×two columns of the pixel matrix and two demultiplexers 320 connected to the pixel circuits 11*a* to 11*d* will be described. The pixel circuit 11*a* and the pixel circuit 11*b* are arranged side by side in the vertical scanning direction (the direction in which the source bus lines SL extend). The pixel circuit 11*c* and the pixel circuit 11*d* are arranged side by side in the vertical scanning direction. As described above, each demultiplexer 320 includes two connection control transistors 321. In the present embodiment, the connection control transistors 321 are P-channel type LTPS-TFTs.

As can be grasped from FIG. 8, a connection control transistor 321*a* is provided corresponding to a source bus line SL connected to the pixel circuit 11*a*, a connection control transistor 321*b* is provided corresponding to a source bus line SL connected to the pixel circuit 11*b*, a connection control transistor 321*c* is provided corresponding to a source bus line SL connected to the pixel circuit 11*c*, and a connection control transistor 321*d* is provided corresponding to a source bus line SL connected to the pixel circuit 11*d*. Each connection control transistor 321 has a control terminal to which a control signal ASW is provided; a first conductive terminal connected to a corresponding data output line DL; and a second conductive terminal connected to a corresponding source bus line SL. Regarding this, a control signal ASW1 is provided to the control terminals of the connection control transistors 321*a* and 321*c*, and a control signal ASW2 is provided to the control terminals of the connection control transistors 321*b* and 321*d*. During a period during which the control signal ASW1 is at low level and the control signal ASW2 is at high level, the connection control transistors 321*a* and 321*c* are in on state, by which data signals are applied to the source bus line SL connected to the pixel circuit 11*a* and the source bus line SL connected to the pixel circuit 11*c*. During a period during which the control signal ASW1 is at high level and the control signal ASW2 is at low level, the connection control transistors 321*b* and 321*d* are in on state, by which data signals are applied to the source bus line SL connected to the pixel circuit 11*b* and the source bus line SL connected to the pixel circuit 11*d*.

In the present embodiment, the display control circuit 40 changes the waveforms of the control signal ASW1 and the control signal ASW2 such that two connection control transistors 321 that constitute each demultiplexer 320 sequentially go into on state for a predetermined period in one period, with two horizontal scanning periods serving as one period.

As above, two source bus lines SL are provided for each column of pixel circuits 11 arranged side by side in the vertical scanning direction, and when two pixel circuits 11 arranged side by side in the vertical scanning direction are defined as a "first pixel circuit" and a "second pixel circuit", the first pixel circuit is connected to one of the two source bus lines SL and the second pixel circuit is connected to the other one of the two source bus lines SL. In addition, between the plurality of source bus lines SL and the source driver 31 there is provided, for each output terminal of the source driver 31, a demultiplexer 320 having two connection control transistors 321 for controlling an electrical connection state between the output terminal and corresponding two source bus lines SL. In each demultiplexer 320, with two horizontal scanning periods serving as one period, two connection control transistors 321 sequentially go into on state for a predetermined period in one period.

<1.4 Gate Drivers>

<1.4.1 Overall Configuration of the Gate Drivers>

FIG. 1 is an overall schematic configuration diagram of the gate drivers 21 in the present embodiment. As described above, each gate driver 21 is composed of the write control circuit 211 and the initialization control circuit 212. In the first picture-frame region there are disposed a write control circuit 211(L1) that applies write control signals SCAN to even-numbered write control lines; a write control circuit 211(L2) that applies write control signals SCAN to odd-numbered write control lines; and an initialization control circuit 212(L) that applies initialization signals DIS to even-numbered initialization control lines. In the second picture-frame region there are disposed a write control circuit 211(R1) that applies write control signals SCAN to the even-numbered write control lines; a write control circuit 211(R2) that applies write control signals SCAN to the odd-numbered write control lines; and an initialization control circuit 212(R) that applies initialization signals DIS to odd-numbered initialization control lines. When taking a look at the initialization control circuits 212, unlike the configuration of the comparative example shown in FIG. 30, only the initialization control circuit 212(L) for the even-numbered initialization control lines is provided in the first picture-frame region, and only the initialization control circuit 212(R) for the odd-numbered initialization control lines is provided in the second picture-frame region.

Figure 9:
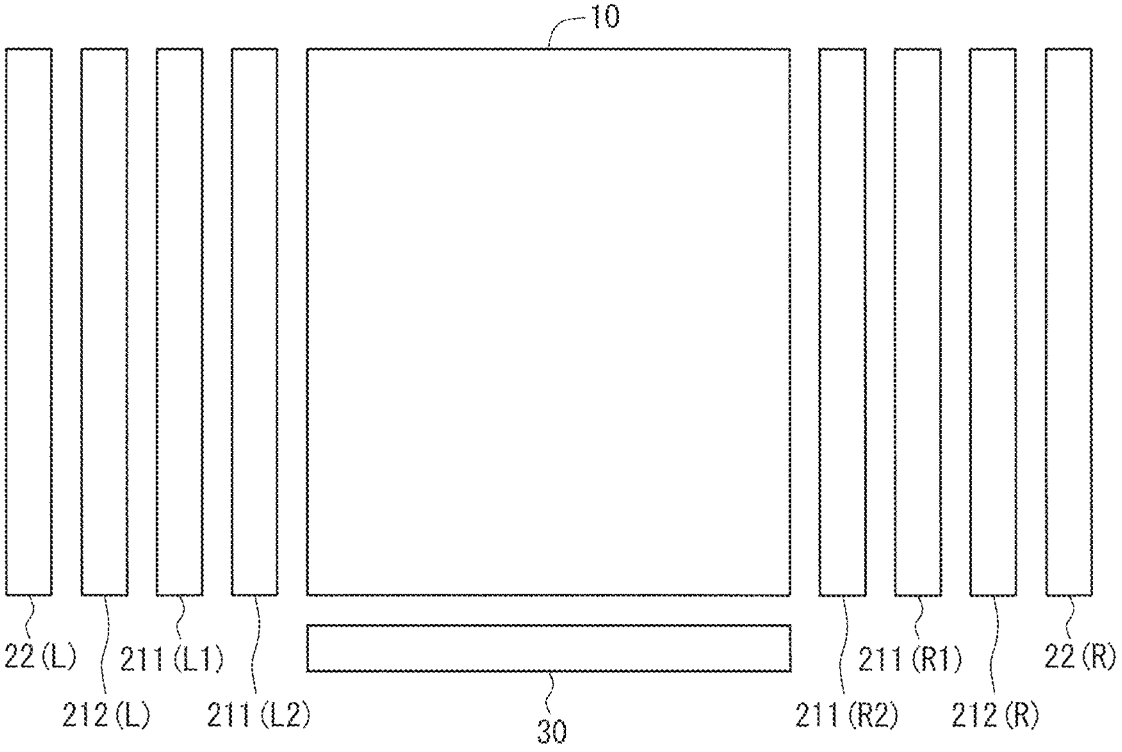
FIG. 9 is a diagram for describing disposition of whole drive circuits in the first embodiment.

Since the gate drivers 21 are configured as shown in FIG. 1, disposition of whole drive circuits is such as that shown in FIG. 9. In the first picture-frame region there are disposed the initialization control circuit 212(L), the write control circuit 211(L1), the write control circuit 211(L2), and a light-emission control circuit 22(L) that drives the light-emission control lines from the left-edge side of the display unit 10. In the second picture-frame region there are disposed the initialization control circuit 212(R), the write control circuit 211(R1), the write control circuit 211(R2), and a light-emission control circuit 22(R) that drives the light-emission control lines from the right-edge side of the display unit 10. In addition, the video signal line driving unit 30 is disposed in a picture-frame region located below the display unit 10 in the drawing.

Figure 10:
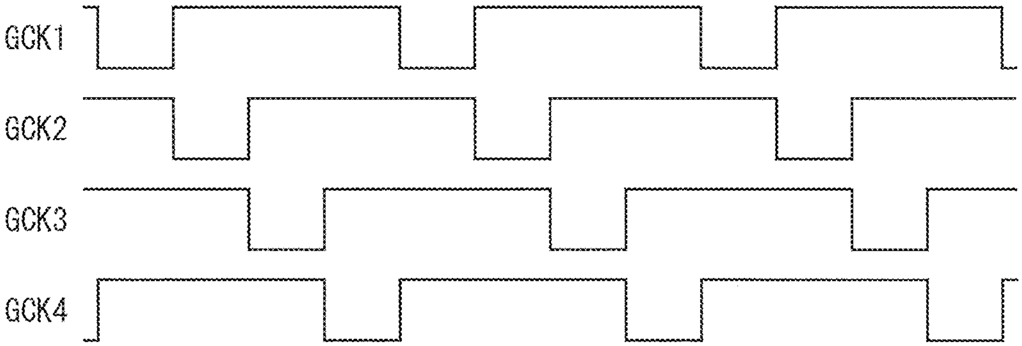
FIG. 10 is a waveform diagram of gate clock signals in the first embodiment.

Meanwhile, in the present embodiment, four-phase clock signals (gate clock signals GCK1 to GCK4) are provided to the gate driver 21. The gate clock signals GCK1 to GCK4 are included in the aforementioned control signals GCTL. FIG. 10 is a waveform diagram of the gate clock signals GCK1 to GCK4. The on-duty of each of the gate clock signals GCK1 to GCK4 is substantially 25%. The gate clock signal GCK2 is delayed in phase by 90 degrees relative to the gate clock signal GCK1. The gate clock signal GCK3 is delayed in phase by 180 degrees relative to the gate clock signal GCK1. The gate clock signal GCK4 is delayed in phase by 270 degrees relative to the gate clock signal GCK1. The gate clock signal GCK1 and the gate clock signal GCK3 are provided to the write control circuit 211(L1), the write control circuit 211(L2), and the initialization control circuit 212(L). The gate clock signal GCK2 and the gate clock signal GCK4 are provided to the write control circuit 211(R1), the write control circuit 211(R2), and the initialization control circuit 212(R).

The four write control circuits 211(L1), 211(L2), 211(R1), and 211(R2) each are implemented by a shift register. A circuit that constitutes each stage of a shift register that implements the write control circuit 211 is hereinafter referred to as "first unit circuit". The two initialization control circuits 212(L) and 212(R) each are also implemented by a shift register. A circuit that constitutes each stage of a shift register that implements the initialization control circuit 212 is hereinafter referred to as "second unit circuit".

Note that in the present embodiment, a first write control circuit is implemented by the write control circuit 211(L1), a second write control circuit is implemented by the write control circuit 211(R1), a third write control circuit is implemented by the write control circuit 211(L2), and a fourth write control circuit is implemented by the write control circuit 211(R2). In addition, a first initialization control circuit is implemented by the initialization control circuit 212(L) and a second initialization control circuit is implemented by the initialization control circuit 212(R). In addition, a first clock signal is implemented by the gate clock signal GCK1, a second clock signal is implemented by the gate clock signal GCK2, a third clock signal is implemented by the gate clock signal GCK3, and a fourth clock signal is implemented by the gate clock signal GCK4.

<1.4.2 Write Control Circuits>

The write control circuits 211 will be described. The write control circuit 211(L1), the write control circuit 211(L2), the write control circuit 211(R1), and the write control circuit 211(R2) have the same configuration. Here, the write control circuit 211(L1) is taken a look at.

<1.4.2.1 Configuration of a Shift Register>

Figure 11:
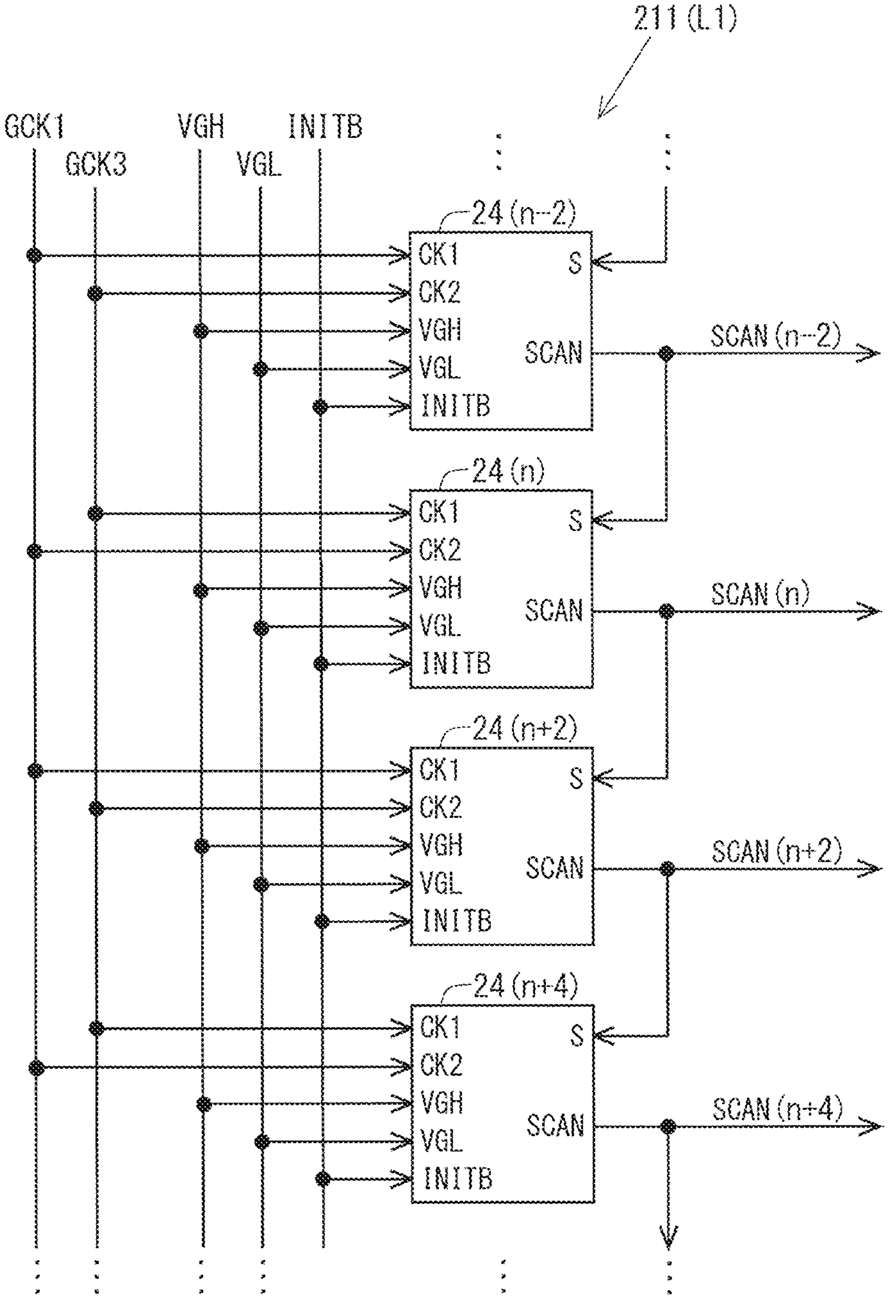
FIG. 11 is a block diagram showing a configuration of a shift register that implements a write control circuit in the first embodiment.

FIG. 11 is a block diagram showing a configuration of a shift register that implements the write control circuit 211 (L1). Note, however, that FIG. 11 only shows a configuration for four stages. The shift register is composed of a plurality of first unit circuits 24. Each first unit circuit 24 is connected to a corresponding write control line SCAN. For example, a first unit circuit 24(*n*) is connected to an nth write control line SCAN(n).

Each first unit circuit 24 includes input terminals for receiving a shift signal S, a first input clock signal CK1, a second input clock signal CK2, a high-level power supply voltage VGH, a low-level power supply voltage VGL, and a reset signal INITB; and an output terminal for outputting a write control signal SCAN.

To each first unit circuit 24 is provided, as a shift signal S, a write control signal SCAN outputted from its previous stage. In addition, for example, to a first unit circuit 24 in an odd-numbered stage is provided a gate clock signal GCK1 as a first input clock signal CK1 and is provided a gate clock signal GCK3 as a second input clock signal CK2, and to a first unit circuit 24 in an even-numbered stage is provided the gate clock signal GCK3 as a first input clock signal CK1 and is provided the gate clock signal GCK1 as a second input clock signal CK2. A write control signal SCAN outputted from the first unit circuit 24 is applied to a corresponding write control line and provided as a shift signal S to a subsequent stage.

<1.4.2.2 Configuration and Operation of the First Unit Circuit>

Figure 12:
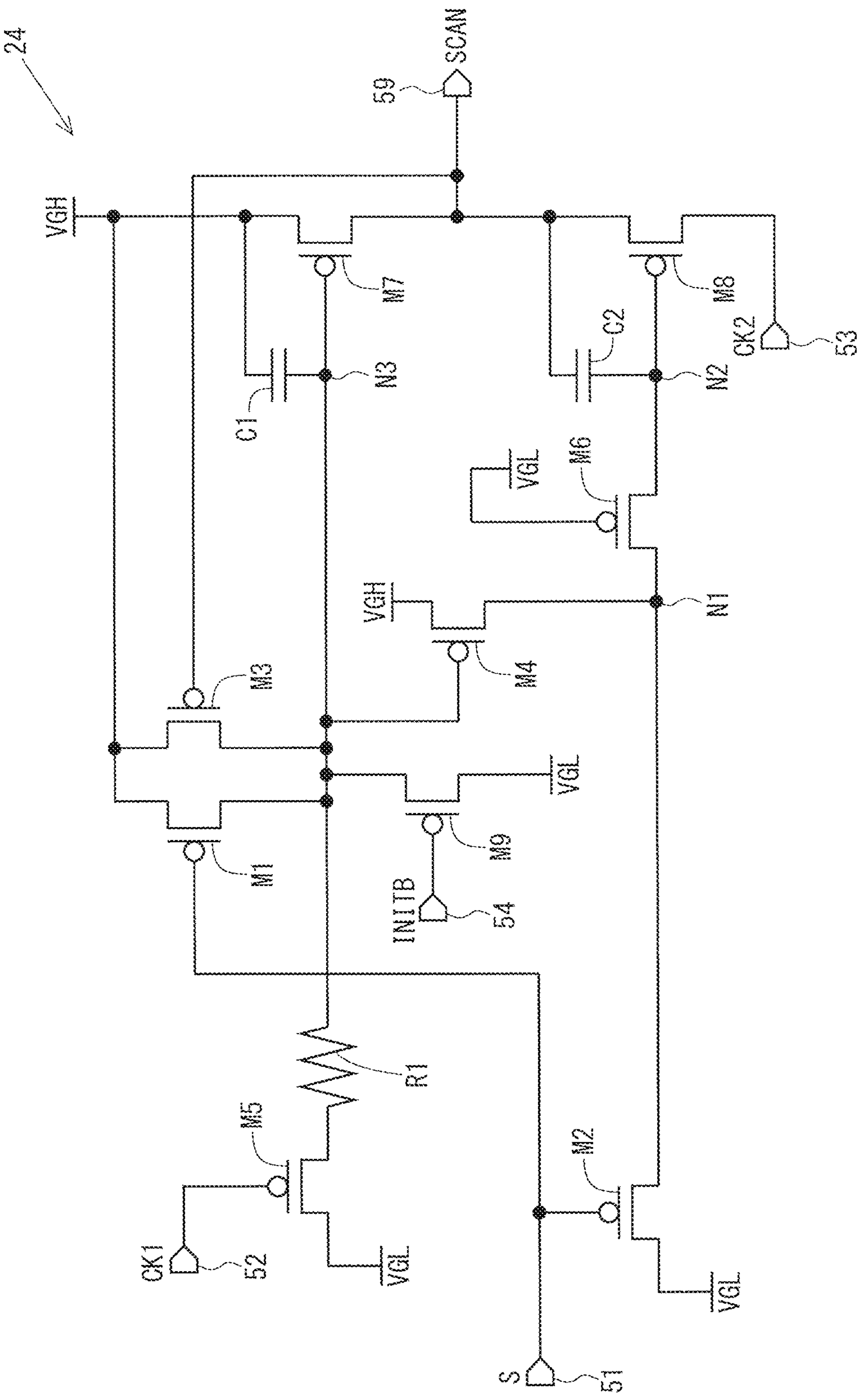
FIG. 12 is a circuit diagram showing a configuration of a first unit circuit in the first embodiment.

FIG. 12 is a circuit diagram showing a configuration of a first unit circuit 24 in the present embodiment. As shown in FIG. 12, the first unit circuit 24 includes nine transistors M1 to M9, two capacitors C1 and C2, and one resistor R1. The transistors M1 to M9 are P-channel type LTPS-TFTs. The first unit circuit 24 also has four input terminals 51 to 54 and one output terminal 59 in addition to an input terminal connected to a second high-level power line that supplies a high-level power supply voltage VGH and an input terminal connected to a second low-level power line that supplies a low-level power supply voltage VGL. In FIG. 12, an input terminal for receiving the shift signal S is given reference character 51, an input terminal for receiving the first input clock signal CK1 is given reference character 52, an input terminal for receiving the second input clock signal CK2 is given reference character 53, an input terminal for receiving the reset signal INITB is given reference character 54, and an output terminal for outputting the write control signal SCAN is given reference character 59.

A first conductive terminal of the transistor M2, a second conductive terminal of the transistor M4, and a first conductive terminal of the transistor M6 are connected to each other through a first internal node N1. A second conductive terminal of the transistor M6, a control terminal of the transistor M8, and a first electrode of the capacitor C2 are connected to each other through a second internal node N2. A second conductive terminal of the transistor M1, a second conductive terminal of the transistor M3, a control terminal of the transistor M4, a control terminal of the transistor M7, a first conductive terminal of the transistor M9, a first electrode of the capacitor C1, and one terminal of the resistor R1 are connected to each other through a third internal node N3.

The transistor M1 is connected at its control terminal to the input terminal 51, connected at its first conductive terminal to the second high-level power line, and connected at its second conductive terminal to the third internal node N3. The transistor M2 is connected at its control terminal to the input terminal 51, connected at its first conductive terminal to the first internal node N1, and connected at its second conductive terminal to the second low-level power line. The transistor M3 is connected at its control terminal to the output terminal 59, connected at its first conductive terminal to the second high-level power line, and connected at its second conductive terminal to the third internal node N3. The transistor M4 is connected at its control terminal to the third internal node N3, connected at its first conductive terminal to the second high-level power line, and connected at its second conductive terminal to the first internal node N1. The transistor M5 is connected at its control terminal to the input terminal 52, connected at its first conductive terminal to the other terminal of the resistor R1, and connected at its second conductive terminal to the second low-level power line.

The transistor M6 is connected at its control terminal to the second low-level power line, connected at its first conductive terminal to the first internal node N1, and connected at its second conductive terminal to the second internal node N2. The transistor M7 is connected at its control terminal to the third internal node N3, connected at its first conductive terminal to the second high-level power line, and connected at its second conductive terminal to the output terminal 59. The transistor M8 is connected at its control terminal to the second internal node N2, connected at its first conductive terminal to the output terminal 59, and connected at its second conductive terminal to the input terminal 53. The transistor M9 is connected at its control terminal to the input terminal 54, connected at its first conductive terminal to the third internal node N3, and connected at its second conductive terminal to the second low-level power line. The capacitor C1 is connected at its first electrode to the control terminal of the transistor M7 and connected at its second electrode to the first conductive terminal of the transistor M7. The capacitor C2 is connected at its first electrode to the control terminal of the transistor M8 and connected at its second electrode to the first conductive terminal of the transistor M8. The resistor R1 is connected at its one terminal to the third internal node N3 and connected at its other terminal to the first conductive terminal of the transistor M5.

The reset signal INITB provided to the input terminal 54 is maintained at high level upon normal operation. Thus, the transistor M9 is maintained in off state throughout a period during which normal operation is performed.

Now, the transistor M6 is taken a look at. The control terminal of the transistor M6 is connected to the second low-level power line. A potential provided by the second low-level power line is a potential having a level at which the transistor M6 is maintained in on state, except when the potential at the first internal node N1 or the second internal node N2 is lower than a normal low level. That is, the transistor M6 is maintained in on state except when the potential at the first internal node N1 or the second internal node N2 is lower than the normal low level. The transistor M6 goes into off state when the potential at the second internal node N2 reaches less than or equal to a predetermined potential, by which the first internal node N1 and the second internal node N2 are electrically isolated from each other. By this, the transistor M6 assists in reduction of potential at the second internal node N2 occurring when the second internal node N2 goes into boost state.

Figure 13:
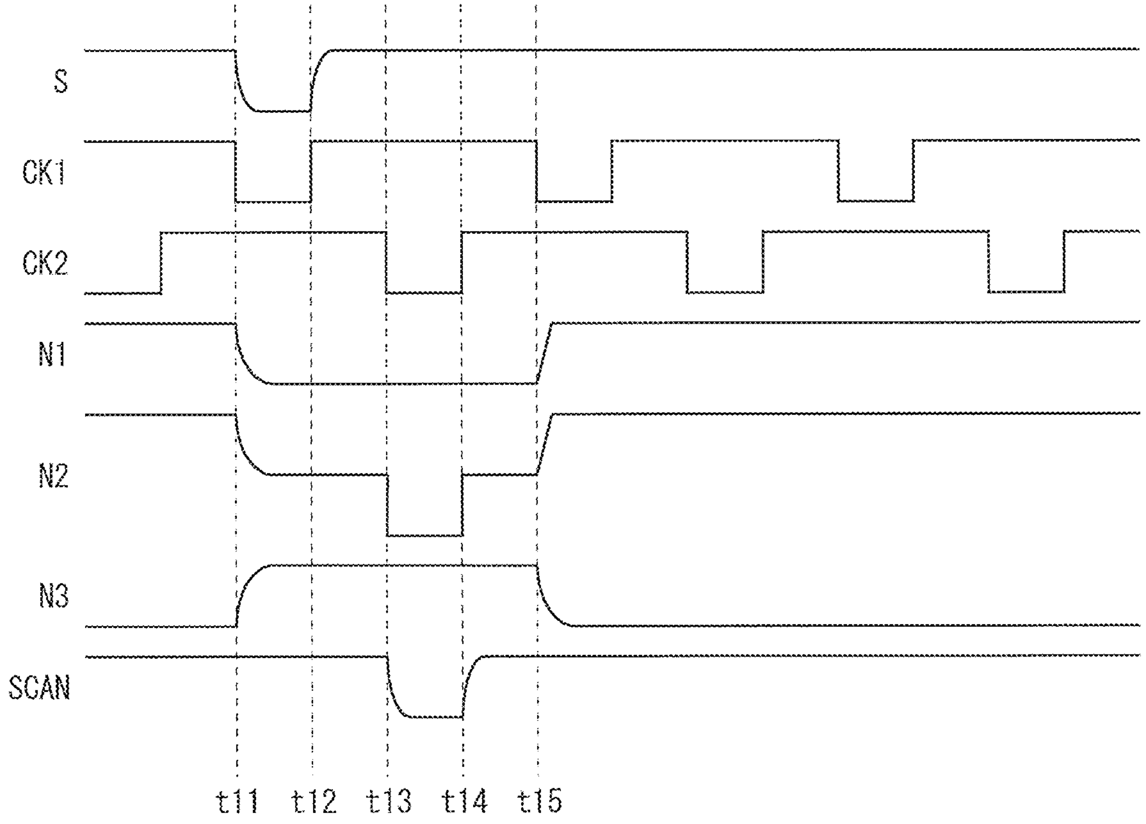
FIG. 13 is a waveform diagram for describing operation of the first unit circuit in the first embodiment.

Next, with reference to FIG. 13, operation of the first unit circuit 24 will be described. Note that it is assumed that a period from time t13 to time t14 is a period during which a pulse of the write control signal SCAN is to be outputted from the first unit circuit 24.

At a point in time immediately before time t11, the shift signal S is at high level, the first input clock signal CK1 is at high level, the second input clock signal CK2 is at high level, the potential at the first internal node N1 is at high level, the potential at the second internal node N2 is at high level, the potential at the third internal node N3 is at low level, and the write control signal SCAN is at high level.

At time t11, the shift signal S changes from high level to low level. By this, the transistor M2 goes into on state, by which the potentials at the first internal node N1 and the second internal node N2 decrease. As a result, the transistor M8 goes into on state. However, during a period from time t11 to time t12, the second input clock signal CK2 is maintained at high level, and thus, the potential at the output terminal 59 (the potential of the write control signal SCAN)

is maintained at high level. In addition, at time t11, the transistor M1 goes into on state, and thus, the potential at the third internal node N3 increases.

During a period from time t12 to time t13, as with the period from time t11 to time t12, the second input clock signal CK2 is maintained at high level. Thus, during the period from time t12 to time t13, the potential at the output terminal 59 (the potential of the write control signal SCAN) is maintained at high level.

At time t13, the second input clock signal CK2 changes from high level to low level. At this time, since the transistor M8 is in on state, the potential at the output terminal 59 (the potential of the write control signal SCAN) decreases with a decrease in the potential at the input terminal 53. Here, since the capacitor C2 is provided between the second internal node N2 and the output terminal 59, the potential at the second internal node N2 also decreases with the decrease in the potential at the output terminal 59. As a result, a large negative voltage is applied to the control terminal of the transistor M8, by which the potential at the output terminal 59 (the potential of the write control signal SCAN) sufficiently decreases. Note that during the period from time t13 to time t14, the transistor M6 goes into off state, by which the potential at the first internal node N1 is maintained at a potential obtained before time t13.

At time t14, the second input clock signal CK2 changes from low level to high level. By this, the potential at the output terminal 59 (the potential of the write control signal SCAN) increases with an increase in the potential at the input terminal 53. When the potential at the output terminal 59 increases, the potential at the second internal node N2 also increases through the capacitor C2. By this, the transistor M6 goes into on state.

At time t15, the first input clock signal CK1 changes from high level to low level. By this, the transistor M5 goes into on state, by which the potential at the third internal node N3 decreases. By the decrease in the potential at the third internal node N3, the transistor M4 goes into on state. As a result, the potential at the first internal node N1 increases. At this time, since the transistor M6 is in on state, the potential at the second internal node N2 also increases.

During a period after time t15, as with the point in time immediately before time t11, the shift signal S is maintained at high level, the potential at the first internal node N1 is maintained at high level, the potential at the second internal node N2 is maintained at high level, the potential at the third internal node N3 is maintained at low level, and the write control signal SCAN is maintained at high level.

<1.4.3 Initialization Control Circuits>

Next, the initialization control circuits 212 will be described. The initialization control circuit 212(L) and the initialization control circuit 212(R) have the same configuration. Here, the initialization control circuit 212(L) is taken a look at.

<1.4.3.1 Configuration of a Shift Register>

Figure 14:
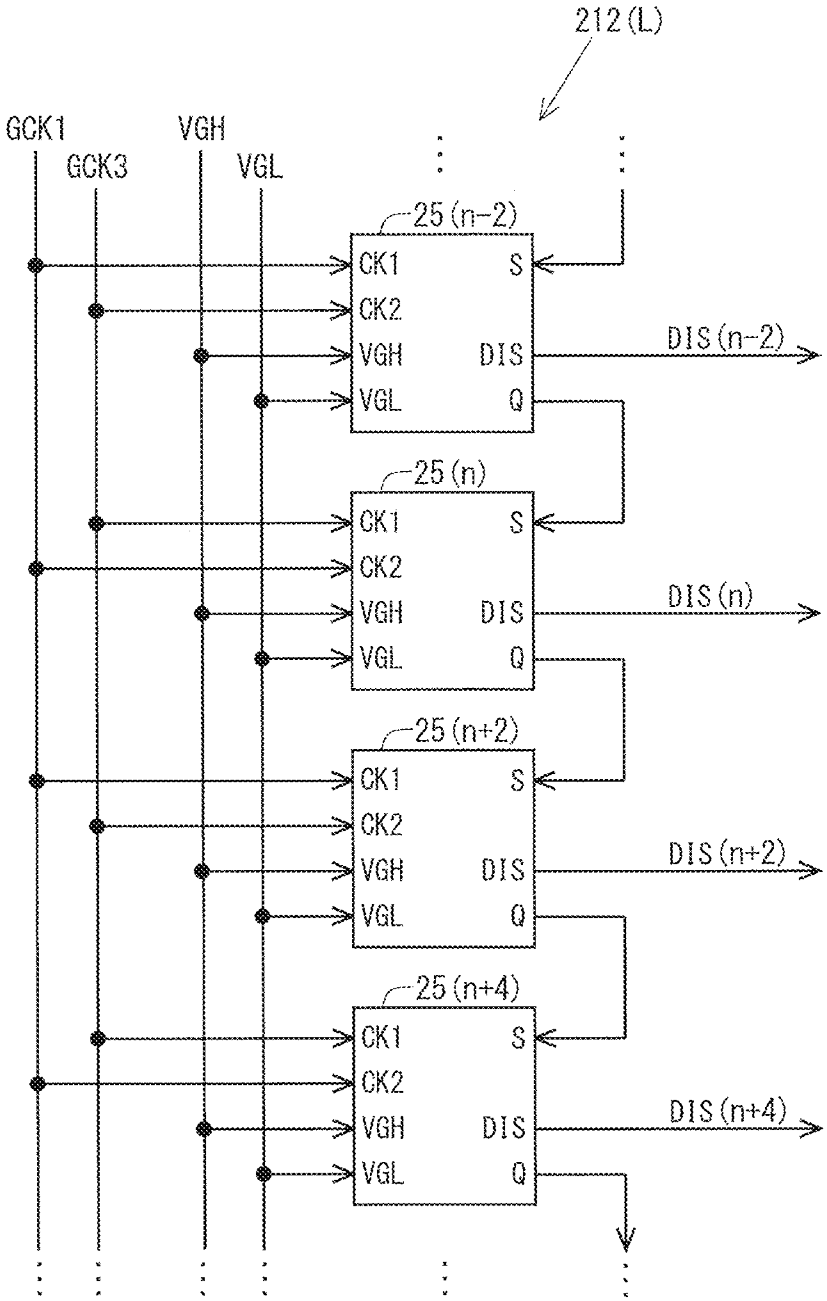
FIG. 14 is a block diagram showing a configuration of a shift register that implements an initialization control circuit in the first embodiment.

FIG. 14 is a block diagram showing a configuration of a shift register that implements the initialization control circuit 212(L). Note, however, that FIG. 14 only shows a configuration for four stages. The shift register is composed of a plurality of second unit circuits 25. Each second unit circuit 25 is connected to a corresponding initialization control line DIS. For example, a second unit circuit 25(*n*) is connected to an nth initialization control line DIS(n).

Each second unit circuit 25 includes input terminals for receiving a shift signal S, a first input clock signal CK1, a second input clock signal CK2, a high-level power supply voltage VGH, and a low-level power supply voltage VGL; and output terminals for outputting an initialization signal DIS and an output signal Q.

To each second unit circuit 25 is provided, as a shift signal S, an output signal Q outputted from its previous stage. In addition, for example, to a second unit circuit 25 in an odd-numbered stage is provided a gate clock signal GCK1 as a first input clock signal CK1 and is provided a gate clock signal GCK3 as a second input clock signal CK2, and to a second unit circuit 25 in an even-numbered stage is provided the gate clock signal GCK3 as a first input clock signal CK1 and is provided the gate clock signal GCK1 as a second input clock signal CK2. An initialization signal DIS outputted from the second unit circuit 25 is applied to a corresponding initialization control line. An output signal Q outputted from the second unit circuit 25 is provided as a shift signal S to a subsequent stage.

<1.4.3.2 Configuration and Operation of the Second Unit Circuit>

Figure 15:
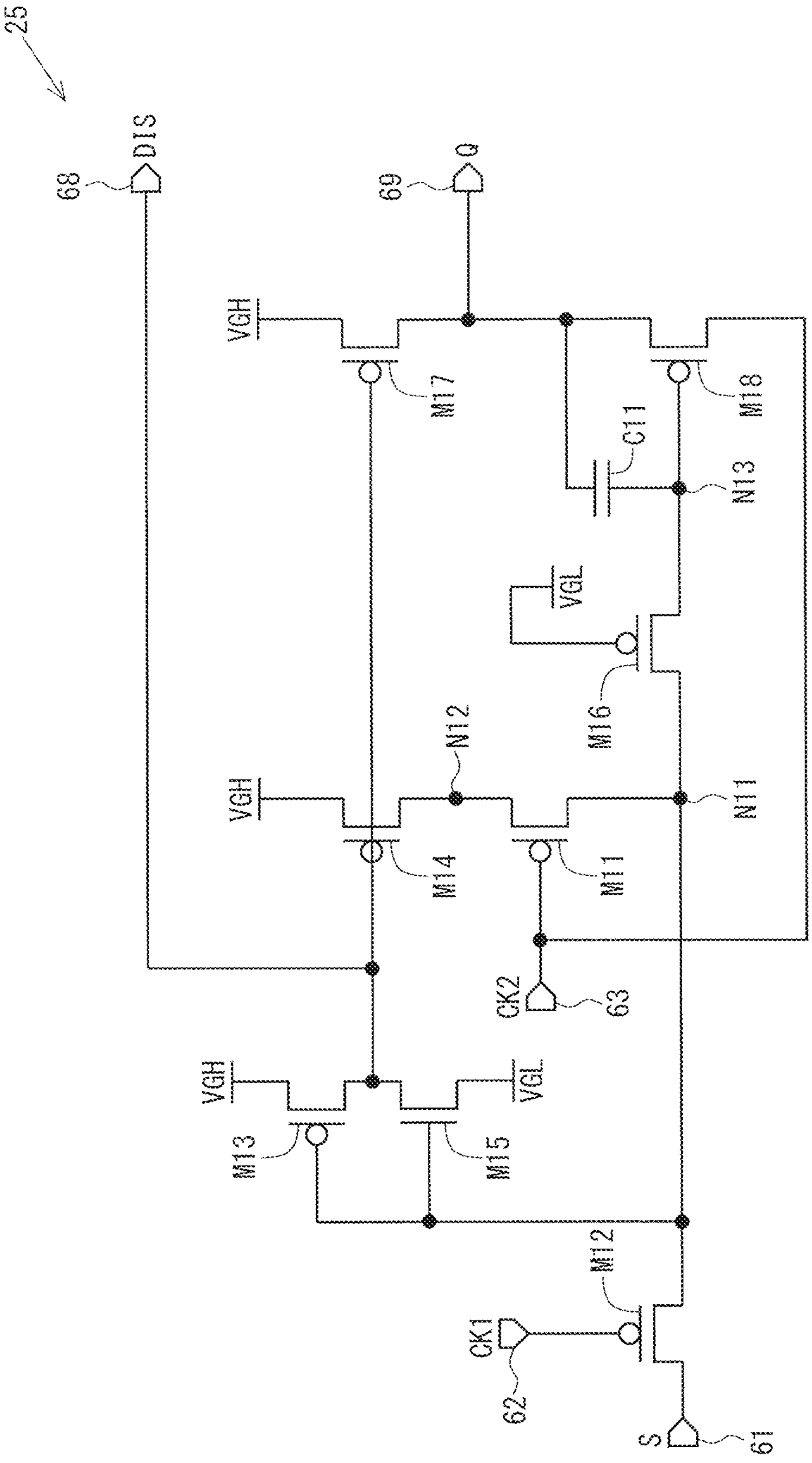
FIG. 15 is a circuit diagram showing a configuration of a second unit circuit in the first embodiment.

FIG. 15 is a circuit diagram showing a configuration of a second unit circuit 25 in the present embodiment. As shown in FIG. 15, the second unit circuit 25 includes eight transistors M11 to M18 and one capacitor C11. The transistors M11 to M14 and M16 to M18 are P-channel type LTPS-TFTs. The transistor M15 is an N-channel type IGZO-TFT. The second unit circuit 25 also has three input terminals 61 to 63 and two output terminals 68 and 69 in addition to an input terminal connected to a second high-level power line that supplies a high-level power supply voltage VGH and an input terminal connected to a second low-level power line that supplies a low-level power supply voltage VGL. In FIG. 15, an input terminal for receiving the shift signal S is given reference character 61, an input terminal for receiving the first input clock signal CK1 is given reference character 62, an input terminal for receiving the second input clock signal CK2 is given reference character 63, an output terminal for outputting the initialization signal DIS is given reference character 68, and an output terminal for outputting the output signal Q is given reference character 69.

A second conductive terminal of the transistor M11, a first conductive terminal of the transistor M12, a control terminal of the transistor M13, a control terminal of the transistor M15, and a first conductive terminal of the transistor M16 are connected to each other through a first internal node N11. A first conductive terminal of the transistor M11 and a second conductive terminal of the transistor M14 are connected to each other through a second internal node N12. A second conductive terminal of the transistor M16, a control terminal of the transistor M18, and a first electrode of the capacitor C11 are connected to each other through a third internal node N13.

The transistor M11 is connected at its control terminal to the input terminal 63, connected at its first conductive terminal to the second internal node N12, and connected at its second conductive terminal to the first internal node N11. The transistor M12 is connected at its control terminal to the input terminal 62, connected at its first conductive terminal to the first internal node N11, and connected at its second conductive terminal to the input terminal 61. The transistor M13 is connected at its control terminal to the first internal node N11, connected at its first conductive terminal to the second high-level power line, and connected at its second conductive terminal to the output terminal 68. The transistor M14 is connected at its control terminal to the output terminal 68, connected at its first conductive terminal to the second high-level power line, and connected at its second conductive terminal to the second internal node N12. The transistor M15 is connected at its control terminal to the first internal node N11, connected at its first conductive terminal to the output terminal 68, and connected at its second conductive terminal to the second low-level power line.

The transistor M16 is connected at its control terminal to the second low-level power line, connected at its first conductive terminal to the first internal node N11, and connected at its second conductive terminal to the third internal node N13. The transistor M17 is connected at its control terminal to the output terminal 68, connected at its first conductive terminal to the second high-level power line, and connected at its second conductive terminal to the output terminal 69. The transistor M18 is connected at its control terminal to the third internal node N13, connected at its first conductive terminal to the output terminal 69, and connected at its second conductive terminal to the input terminal 63. The capacitor C11 is connected at its first electrode to the control terminal of the transistor M18 and connected at its second electrode to the first conductive terminal of the transistor M18. As with the transistor M6 in the first unit circuit 24 (see FIG. 12), the transistor M16 is maintained in on state, except when the potential at the first internal node N11 or the third internal node N13 is lower than a normal low level.

In the present embodiment, the size of the transistor M17 and the transistor M18 among the eight transistors M11 to M18 is minimized. Specifically, channel width of each of the transistor M17 and the transistor M18 is 4 micrometers or less.

Note that, in the present embodiment, a second-internal-node falling control transistor is implemented by the transistor M11, an input control transistor is implemented by the transistor M12, an initialization signal rising control transistor is implemented by the transistor M13, a second-internal-node rising control transistor is implemented by the transistor M14, an initialization signal falling control transistor is implemented by the transistor M15, an isolating transistor is implemented by the transistor M16, a shift signal rising control transistor is implemented by the transistor M17, and a shift signal falling control transistor is implemented by the transistor M18. In addition, a shift signal falling control capacitor is implemented by the capacitor C11. In addition, a first output terminal is implemented by the output terminal 68 and a second output terminal is implemented by the output terminal 69.

Figure 16:
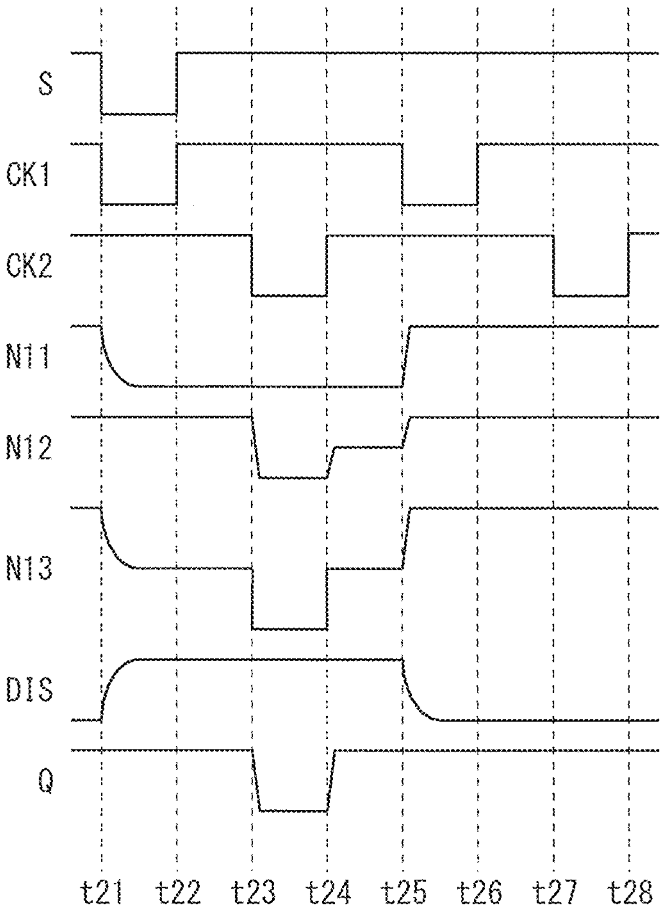
FIG. 16 is a waveform diagram for describing operation of the second unit circuit in the first embodiment.

Next, with reference to FIG. 16, operation of the second unit circuit 25 will be described. At a point in time immediately before time t21, the shift signal S is at high level, the first input clock signal CK1 is at high level, the second input clock signal CK2 is at high level, the potential at the first internal node N11 is at high level, the potential at the second internal node N12 is at high level, the potential at the third internal node N13 is at high level, the initialization signal DIS is at low level, and the output signal Q is at high level.

At time t21, the shift signal S changes from high level to low level and the first input clock signal CK1 changes from high level to low level. By this, the transistor M12 goes into on state, by which the potentials at the first internal node N11 and the third internal node N13 decrease. By the decrease in the potential at the first internal node N11, the transistor M13 goes into on state and the transistor M15 goes into off state. By this, the potential at the output terminal 68 (the potential of the initialization signal DIS) changes from low level to high level. The transistor M14 and the transistor M17 go into off state. In addition, by the decrease in the potential at the third internal node N13, the transistor M18 goes into on state. However, during a period from time t21 to time t22, the second input clock signal CK2 is maintained at high level, and thus, the potential at the output terminal 69 (the potential of the output signal Q) is maintained at high level.

During a period from time t22 to time t23, as with the period from time t21 to time t22, the second input clock signal CK2 is maintained at high level. Thus, during the period from time t22 to time t23, the potential at the output terminal 69 (the potential of the output signal Q) is maintained at high level.

At time t23, the second input clock signal CK2 changes from high level to low level. At this time, since the transistor M18 is in on state, the potential at the output terminal 69 (the potential of the output signal Q) decreases with a decrease in the potential at the input terminal 63. Here, since the capacitor C11 is provided between the third internal node N13 and the output terminal 69, the potential at the third internal node N13 also decreases with the decrease in the potential at the output terminal 69. As a result, a large negative voltage is applied to the control terminal of the transistor M18, by which the potential at the output terminal 69 (the potential of the output signal Q) sufficiently decreases. Note that during a period from time t23 to time t24, the transistor M16 goes into off state, by which the potential at the first internal node N11 is maintained at a potential obtained before time t23. In addition, at time t23, the transistor M11 goes into on state. By this, the potential at the second internal node N12 decreases.

At time t24, the second input clock signal CK2 changes from low level to high level. By this, the potential at the output terminal 69 (the potential of the output signal Q) increases with an increase in the potential at the input terminal 63. When the potential at the output terminal 69 increases, the potential at the third internal node N13 also increases through the capacitor C11. By this, the transistor M16 goes into on state.

At time t25, the first input clock signal CK1 changes from high level to low level. By this, the transistor M12 goes into on state. At this time, since the shift signal S is at high level, the potentials at the first internal node N11 and the third internal node N13 increase. By the increase in the potential at the third internal node N13, the transistor M18 goes into off state. In addition, by the increase in the potential at the first internal node N11, the transistor M13 goes into off state and the transistor M15 goes into on state. By this, the potential at the output terminal 68 (the potential of the initialization signal DIS) changes from high level to low level. The transistor M14 and the transistor M17 go into on state. By the transistor M14 going into on state, the potential at the second internal node N12 increases.

During a period after time t25, as with the point in time immediately before time t21, the shift signal S is maintained at high level, the potentials at the first internal node N11, the second internal node N12, and the third internal node N13 are maintained at high level, the initialization signal DIS is maintained at low level, and the output signal Q is maintained at high level.

As above, the second unit circuit 25 has a latch function and outputs an initialization signal DIS based on a value held internally. Specifically, the initialization signal DIS rises at a falling edge timing of the first input clock signal CK1, and falls at the next falling edge timing of the first input clock signal CK1. In this manner, as for the initialization signal DIS, a relatively long pulse is generated. For example, when the refresh rate is set to 240 Hz in a given organic EL display device having a resolution called "FHD+" (a resolution a bit higher than FHD), one horizontal scanning period is about 1.7 microseconds. However, according to a technique of the present embodiment, the length of a period corresponding to the pulse width of the initialization signal DIS is about 6.8 microseconds. Accordingly, even if waveform rounding occurs upon rising or falling of a pulse of the initialization signal DIS, sufficient effective time is acquired. Therefore, waveform rounding of the initialization signal DIS has almost no influence on driving operation. Taking into account this fact, the initialization control circuits 212 are configured as shown in FIG. 1 such that each initialization control line is driven from only either one of the one-edge side of the display unit 10 and the other-edge side thereof.

<1.5 Operation Based on the Double-Source Scheme>

Figure 17:
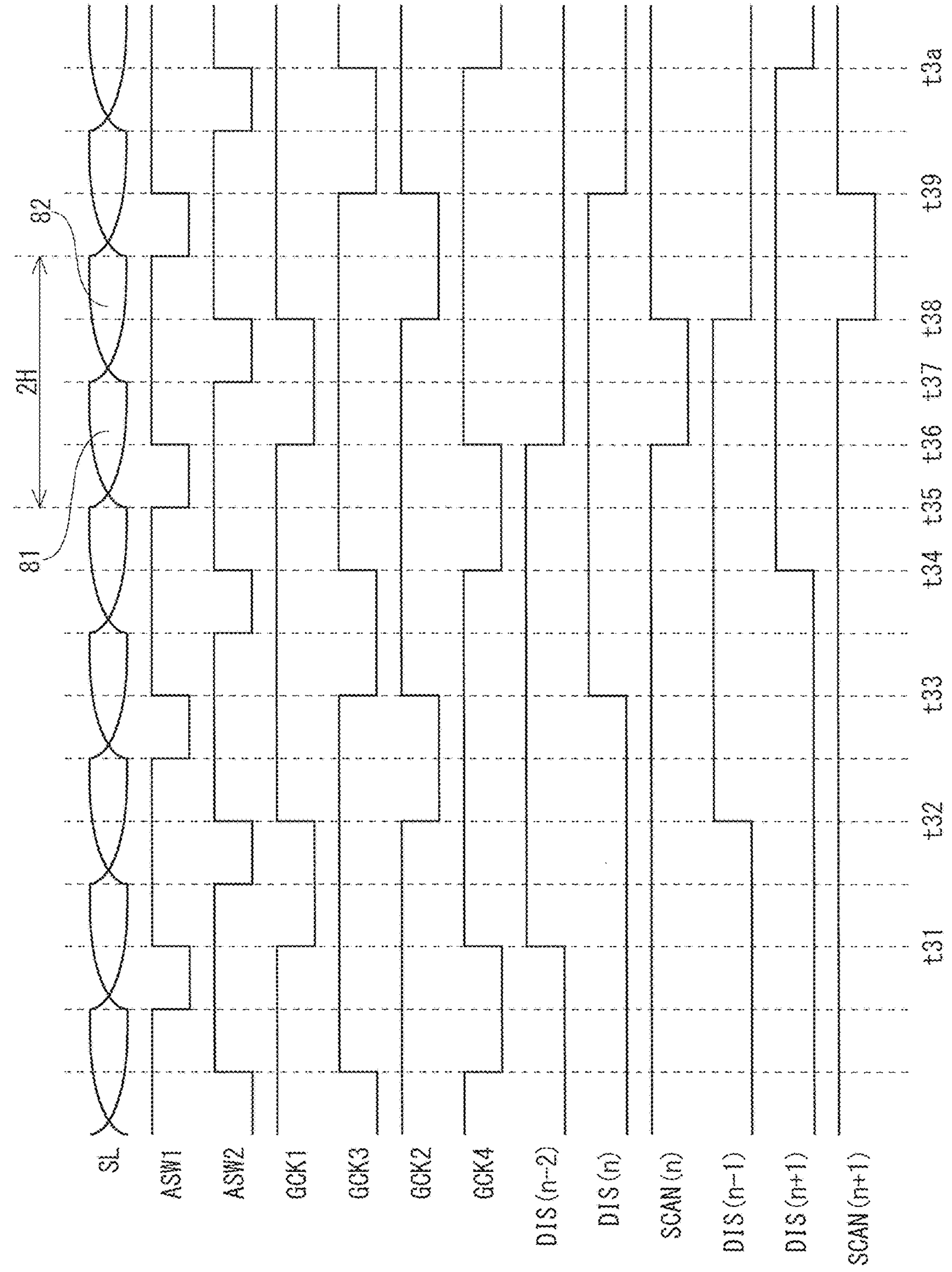
FIG. 17 is a timing chart for describing operation of a gate driver based on a double-source scheme in the first embodiment.

Considering the above description, with reference to FIG. 17, operation of the gate driver 21 based on the double-source scheme will be described. Note that here, attention is paid to operation of the gate driver 21 during a period during which writing of data signals to the pixel circuits 11*a*, 11*b*, 11*c*, and 11*d* shown in FIG. 8 is performed. Regarding FIG. 17, a portion given reference character 81 indicates a data signal to be supplied to a pixel circuit 11 in an nth row, and a portion given reference character 82 indicates a data signal to be supplied to a pixel circuit 11 in an (n+1)th row.

At time t31, by a gate clock signal GCK1 changing from high level to low level, an initialization signal DIS(n−2) changes from low level to high level. By this, in the pixel circuit 11 in the nth row, the first initialization transistor T1 goes into on state, by which the voltage at the control terminal of the drive transistor T4 is initialized. That is, initialization of the pixel circuit 11 in the nth row is performed.

At time t32, by a gate clock signal GCK2 changing from high level to low level, an initialization signal DIS(n−1) changes from low level to high level. By this, in a pixel circuit 11 in an (n−1)th row, the first initialization transistor T1 goes into on state, by which the voltage at the control terminal of the drive transistor T4 is initialized. That is, initialization of the pixel circuit 11 in the (n−1)th row is performed.

At time t33, by a gate clock signal GCK3 changing from high level to low level, an initialization signal DIS(n) changes from low level to high level. By this, in the pixel circuit 11 in the nth row, the threshold voltage compensation transistor T2 goes into on state.

At time t34, by a gate clock signal GCK4 changing from high level to low level, an initialization signal DIS(n+1) changes from low level to high level. By this, in the pixel circuit 11 in the (n+1)th row, the threshold voltage compensation transistor T2 goes into on state.

At time t35, a control signal ASW1 changes from high level to low level. By this, a source bus line SL connected to the pixel circuit 11 in the nth row is charged based on a data signal so that writing of the data signal to the pixel circuit 11 in the nth row is performed during a period from time t36 to time t38.

At time t36, by the gate clock signal GCK1 changing from high level to low level, a write control signal SCAN(n) changes from high level to low level. By this, in the pixel circuit 11 in the nth row, the write control transistor T3 goes into on state, by which the data signal is provided to the first electrode of the holding capacitor Cst through the write control transistor T3, the drive transistor T4, and the threshold voltage compensation transistor T2. Note that the write control signal SCAN(n) is maintained at low level until time t38. Thus, writing of the data signal to the pixel circuit 11 in the nth row is performed over the period from time t36 to time t38.

At time t37, a control signal ASW2 changes from high level to low level. By this, a source bus line SL connected to the pixel circuit 11 in the (n+1)th row is charged based on a data signal so that writing of the data signal to the pixel circuit 11 in the (n+1)th row is performed during a period from time t38 to time t39.

At time t38, by the gate clock signal GCK1 changing from low level to high level, the write control signal SCAN(n) changes from low level to high level. By this, in the pixel circuit 11 in the nth row, the write control transistor T3 goes into off state. That is, the writing of the data signal to the pixel circuit 11 in the nth row is completed. In addition, at time t38, by the gate clock signal GCK2 changing from high level to low level, a write control signal SCAN(n+1) changes from high level to low level. By this, in the pixel circuit 11 in the (n+1)th row, the write control transistor T3 goes into on state, by which the data signal is provided to the first electrode of the holding capacitor Cst through the write control transistor T3, the drive transistor T4, and the threshold voltage compensation transistor T2. Note that the write control signal SCAN(n+1) is maintained at low level until time t39. Thus, writing of the data signal to the pixel circuit 11 in the (n+1)th row is performed over the period from time t38 to time t39.

At time t39, by the gate clock signal GCK3 changing from high level to low level, the initialization signal DIS(n) changes from high level to low level. By this, in the pixel circuit 11 in the nth row, the threshold voltage compensation transistor T2 goes into off state. In addition, at time t39, by the gate clock signal GCK2 changing from low level to high level, the write control signal SCAN(n+1) changes from low level to high level. By this, in the pixel circuit 11 in the (n+1)th row, the write control transistor T3 goes into off state. That is, the writing of the data signal to the pixel circuit 11 in the (n+1)th row is completed.

At time t3*a*, by the gate clock signal GCK4 changing from high level to low level, the initialization signal DIS(n+1) changes from high level to low level. By this, in the pixel circuit 11 in the (n+1)th row, the threshold voltage compensation transistor T2 goes into off state.

<1.6 Effects>

Figure 18:
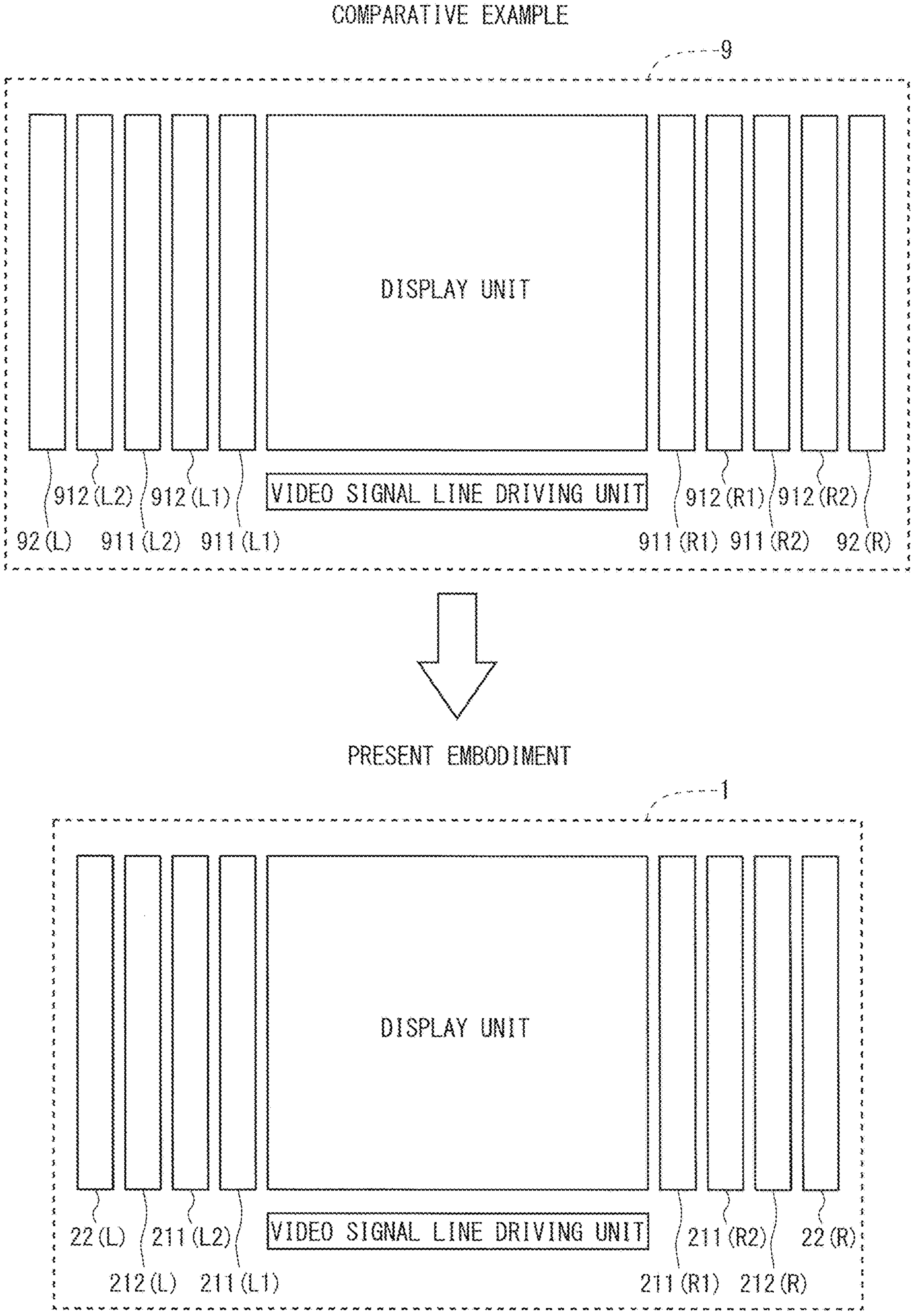
FIG. 18 is a diagram for describing effects in the first embodiment.

According to the present embodiment, the second unit circuit 25 that constitutes each stage of the shift register that implements the initialization control circuit 212 has a latch function and applies the initialization signal DIS to the initialization control line based on a value held internally. Accordingly, the pulse width of the initialization signal DIS applied to the initialization control line is relatively long, and thus, even if the waveform of the initialization signal DIS is rounded, there is almost no influence on driving operation. Taking into account this fact, each initialization control line is driven from only a one-edge side of the display unit 10. Specifically, the initialization control circuit 212 is composed of the initialization control circuit 212(L) provided in the first picture-frame region to apply initialization signals DIS to even-numbered initialization control lines; and the initialization control circuit 212(R) provided in the second picture-frame region to apply initialization signals DIS to odd-numbered initialization control lines. Although disposition of whole drive circuits is such as that shown in a portion given reference character 9 in FIG. 18 in the comparative example, disposition of whole drive circuits is such as that shown in a portion given reference character 1 in FIG. 18 in the present embodiment. According to the present embodiment, it becomes possible to thus reduce the area of a picture frame and increase the margin of the picture-frame regions, compared to the comparative example. In addition, according to the present embodiment, compared to the comparative example, the number of circuit elements for the initialization control circuit 212 decreases, and thus, the possibility of occurrence of failures decreases, improving reliability. In addition, transistors included in each first unit circuit 24 that constitutes each stage of the shift register that implements the write control circuit 211 are all LTPS-TFTs, and each write control line is driven from both the one-edge side of the display unit 10 and the other-edge side thereof, and thus, even if a high refresh rate is adopted, sufficient reliability is acquired for writing of data signals to the pixel circuits 11. As above, according to the present embodiment, an organic EL display device is implemented that can increase the refresh rate while suppressing an increase in the area of a picture frame and a reduction in reliability.

2. Second Embodiment

<2.1 Overview>

In the above-described first embodiment, the pixel circuit 11 includes IGZO-TFTs and LTPS-TFTs (see FIG. 5). Correspondingly, the second unit circuit (the unit circuit that constitutes each stage of the shift register that implements the initialization control circuit 212) 25 includes an IGZO-TFT and LTPS-TFTs (see FIG. 15). On the other hand, in the present embodiment, LTPS-TFTs are used for all transistors in the pixel circuit 11 and all transistors in the second unit circuit 25.

An overall configuration of an organic EL display device, an internal functional configuration of the panel driving units 20, a configuration of the video signal line driving unit 30, and a configuration of the write control circuits 211 are the same as those of the first embodiment (see FIGS. 2, 4, 7, 11 and 12). In addition, an overall schematic configuration of the gate drivers 21 and disposition of whole drive circuits are also the same as those of the first embodiment (see FIGS. 1 and 9). The following mainly describes differences from the first embodiment.

Figure 19:
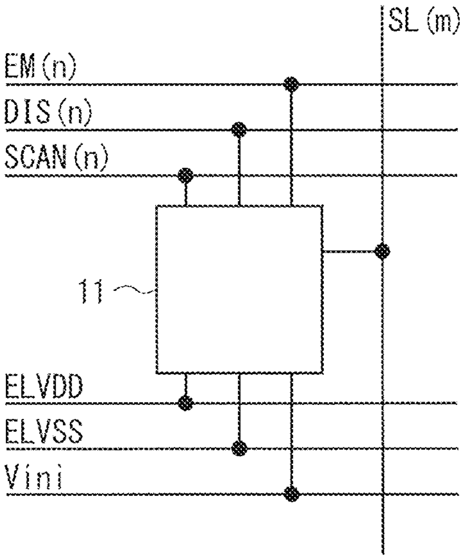
FIG. 19 is a diagram showing a connection relationship between a pixel circuit and various types of wiring lines in a second embodiment.
Figure 20:
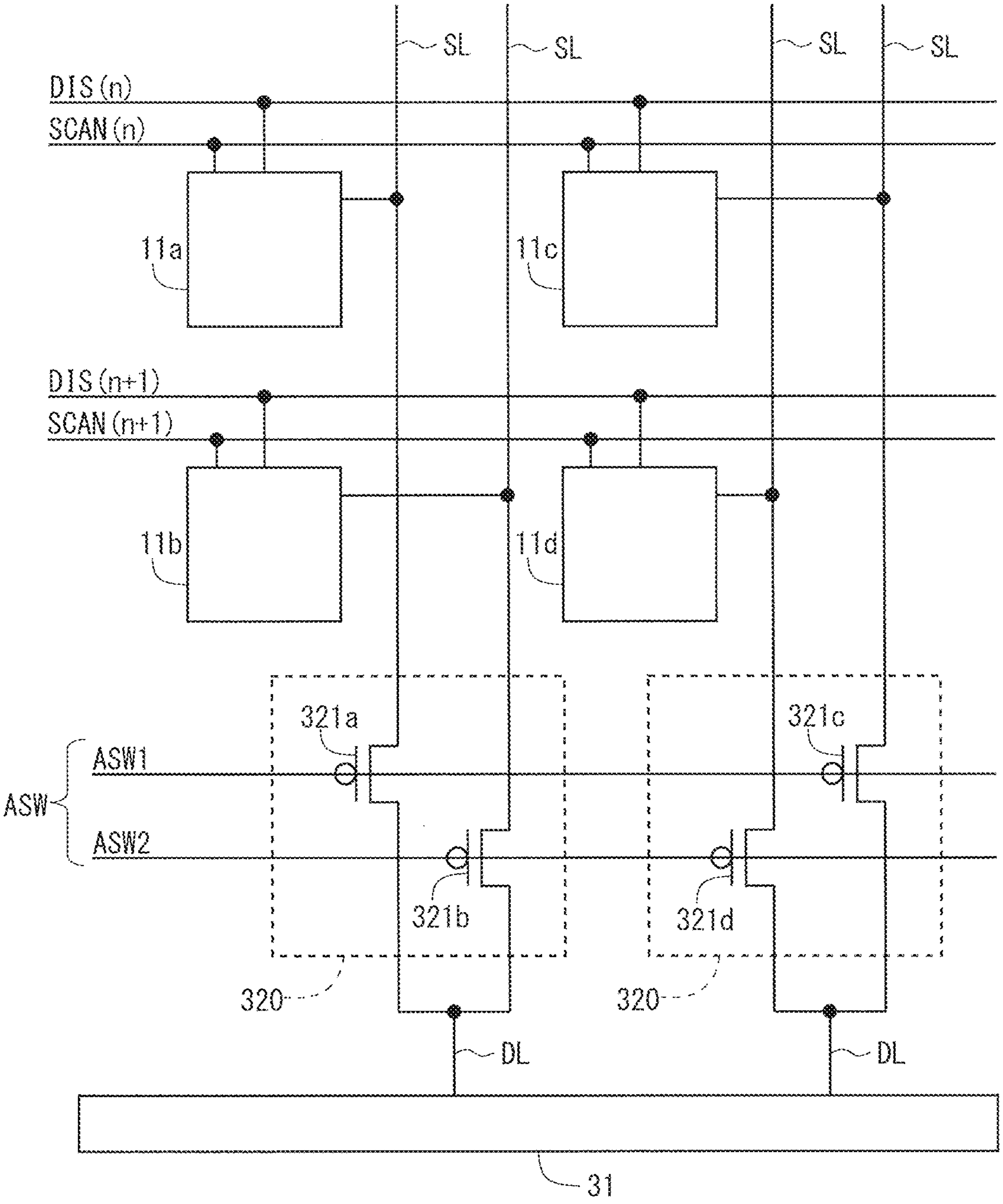
FIG. 20 is a circuit diagram for describing a relationship between four pixel circuits and demultiplexers in the second embodiment.

In the present embodiment, a connection relationship between a pixel circuit 11 corresponding to an nth write control line SCAN(n) and an mth source bus line SL(m) and various types of wiring lines is as shown in FIG. 19. The pixel circuit 11 is connected to the nth write control line SCAN(n), an nth initialization control line DIS(n), an nth light-emission control line EM(n), the mth source bus line SL(m), a first high-level power line, a first low-level power line, and an initialization power line. Unlike the first embodiment, the pixel circuit 11 is not connected to an (n−2)th initialization control line DIS(n−2). Note that, correspondingly, a relationship between four pixel circuits 11*a* to 11*d* for two rows×two columns of the pixel matrix and two demultiplexers 320 connected to the pixel circuits 11*a* to 11*d* is as shown in FIG. 20.

<2.2 Configuration and Operation of the Pixel Circuit>

Figure 21:
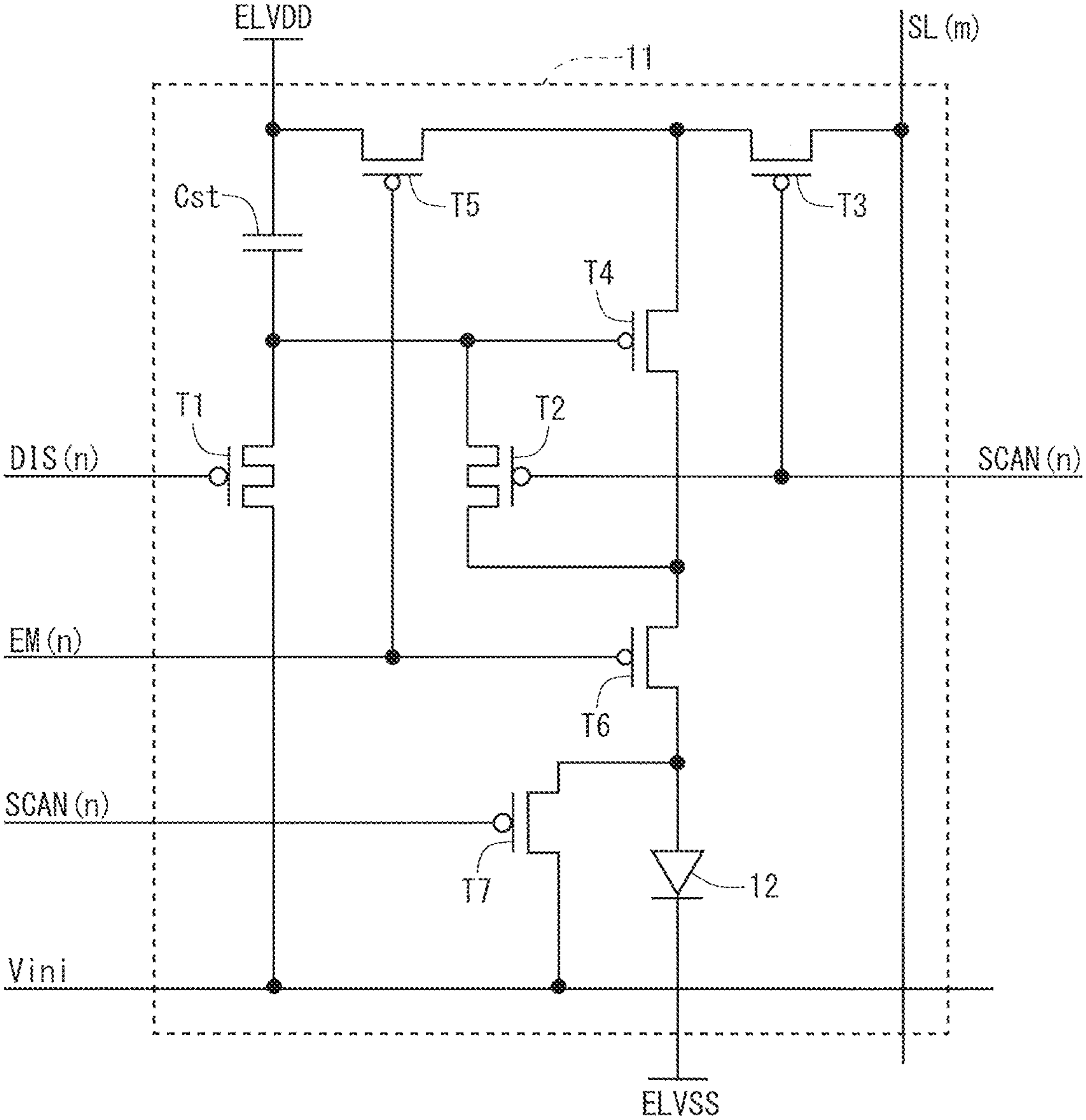
FIG. 21 is a circuit diagram showing a configuration of a pixel circuit in the second embodiment.

FIG. 21 is a circuit diagram showing a configuration of a pixel circuit 11 corresponding to an nth write control line SCAN(n) and an mth source bus line SL(m). Here, only differences from the configuration of the first embodiment shown in FIG. 5 will be described.

A first initialization transistor T1, a threshold voltage compensation transistor T2, and a second initialization transistor T7 are P-channel type LTPS-TFTs. That is, in the present embodiment, transistors in the pixel circuits 11 are all P-channel type LTPS-TFTs. Note that each of the first initialization transistor T1 and the threshold voltage compensation transistor T2 has a dual-gate structure in which two transistors are connected in series with each other. By adopting such a dual-gate structure, effects such as an improvement in breakdown voltage and a reduction in off-current of the transistors can be obtained.

A control terminal of the threshold voltage compensation transistor T2 and a control terminal of the second initialization transistor T7 are connected to the nth write control line SCAN(n). That is, in the present embodiment, the same signal is provided to a control terminal of a write control transistor T3, the control terminal of the threshold voltage compensation transistor T2, and the control terminal of the second initialization transistor T7.

Figure 22:
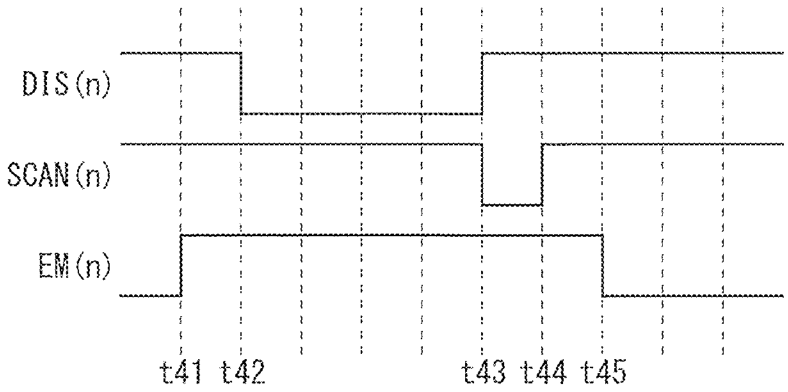
FIG. 22 is a timing chart for describing operation of the pixel circuit in the second embodiment.

Next, with reference to FIG. 22, operation of the pixel circuit 11 of the present embodiment will be described. Note that for FIG. 22, a period before time t41 and a period after time t45 are light-emission periods, and a period from time t41 to t45 is a turn-off period.

At a point in time immediately before time t41, an initialization signal DIS(n) and a write control signal SCAN (n) are at high level, and a light-emission control signal EM(n) is at low level. At this time, a power supply control transistor T5 and a light-emission control transistor T6 are in on state, and an organic EL element 12 emits light depending on the magnitude of a drive current. The first initialization transistor T1, the threshold voltage compensation transistor T2, the write control transistor T3, and the second initialization transistor T7 are in off state.

At time t41, the light-emission control signal EM(n) changes from low level to high level. By this, the power supply control transistor T5 and the light-emission control transistor T6 go into off state. As a result, the supply of the current to the organic EL element 12 is interrupted, by which the organic EL element 12 goes into turn-off state.

At time t42, the initialization signal DIS(n) changes from high level to low level. By this, the first initialization transistor T1 goes into on state. As a result, the voltage at a control terminal of a drive transistor T4 is initialized. That is, the voltage at the control terminal of the drive transistor T4 becomes substantially equal to an initialization voltage Vini.

At time t43, the initialization signal DIS(n) changes from low level to high level. By this, the first initialization transistor T1 goes into off state. In addition, at time t43, the write control signal SCAN(n) changes from high level to low level. By this, the threshold voltage compensation transistor T2, the write control transistor T3, and the second initialization transistor T7 go into on state. By the threshold voltage compensation transistor T2 and the write control transistor T3 going into on state, a data signal SL(m) is provided to a first electrode of a holding capacitor Cst through the write control transistor T3, the drive transistor T4, and the threshold voltage compensation transistor T2. By this, the holding capacitor Cst is charged. In addition, by the second initialization transistor T7 going into on state, an anode voltage of the organic EL element 12 is initialized based on the initialization voltage Vini.

At time t44, the write control signal SCAN(n) changes from low level to high level. By this, the threshold voltage compensation transistor T2, the write control transistor T3, and the second initialization transistor T7 go into off state.

At time t45, the light-emission control signal EM(n) changes from high level to low level. By this, the power supply control transistor T5 and the light-emission control transistor T6 go into on state, by which a drive current based on the charged voltage of the holding capacitor Cst is supplied to the organic EL element 12. As a result, the organic EL element 12 emits light depending on the magnitude of the drive current. Thereafter, the organic EL element 12 emits light throughout a period until the next time the light-emission control signal EM(n) changes from low level to high level.

As above, writing of a data signal to the pixel circuit 11 connected to the nth write control line SCAN(n) is performed by maintaining the write control signal SCAN(n) at on level for a predetermined period after maintaining the initialization signal DIS(n) at on level for a predetermined period.

<2.3 Initialization Control Circuits>

Next, the initialization control circuits 212 of the present embodiment will be described. In the present embodiment, too, the initialization control circuit 212(L) disposed in the first picture-frame region and the initialization control circuit 212(R) disposed in the second picture-frame region have the same configuration. Here, the initialization control circuit 212(L) is taken a look at.

<2.3.2.1 Configuration of a Shift Register>

Figure 23:
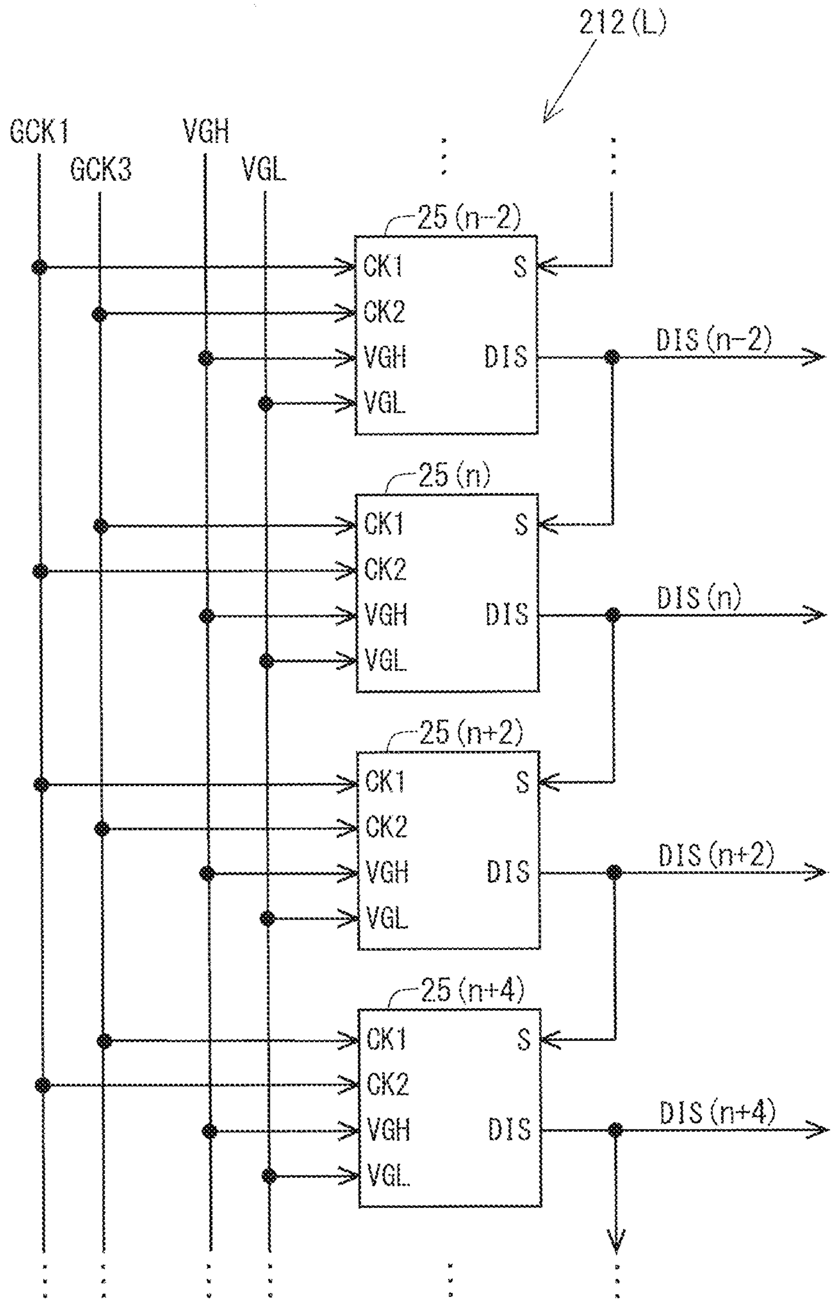
FIG. 23 is a block diagram showing a configuration of a shift register that implements an initialization control circuit in the second embodiment.

FIG. 23 is a block diagram showing a configuration of a shift register that implements the initialization control circuit 212(L). Note, however, that FIG. 23 only shows a configuration for four stages. As in the above-described first embodiment, the shift register is composed of a plurality of second unit circuits 25, and each second unit circuit 25 is connected to a corresponding initialization control line DIS.

Unlike the above-described first embodiment (see FIG. 14), each second unit circuit 25 does not include an output terminal for outputting output an signal Q. An initialization signal DIS outputted from each second unit circuit 25 is applied to a corresponding initialization control line and provided as a shift signal S to a subsequent stage.

<2.3.2.2 Configuration and Operation of the Second Unit Circuit>

Figure 24:
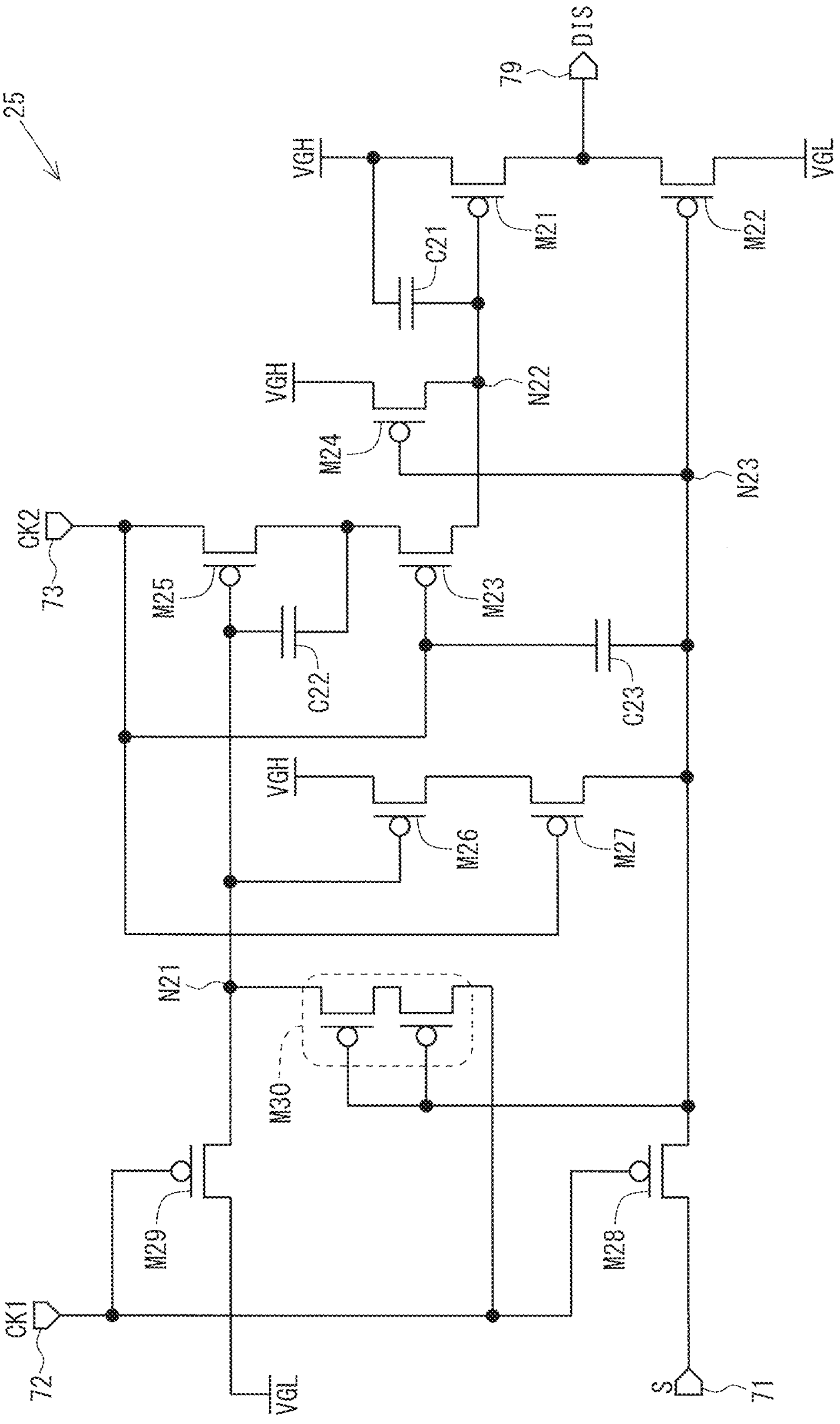
FIG. 24 is a circuit diagram showing a configuration of a second unit circuit in the second embodiment.

FIG. 24 is a circuit diagram showing a configuration of a second unit circuit 25 in the present embodiment. As shown in FIG. 24, the second unit circuit 25 includes 10 transistors M21 to M30 and three capacitors C21 to C23. The transistors M21 to M30 are all P-channel type LTPS-TFTs. Note that the transistor M30 has a dual-gate structure. The second unit circuit 25 also has three input terminals 71 to 73 and one output terminal 79 in addition to an input terminal connected to a second high-level power line that supplies a high-level power supply voltage VGH and an input terminal connected to a second low-level power line that supplies a low-level power supply voltage VGL. In FIG. 24, an input terminal for receiving a shift signal S is given reference character 71, an input terminal for receiving a first input clock signal CK1 is given reference character 72, an input terminal for receiving a second input clock signal CK2 is given reference character 73, and an output terminal for outputting an initialization signal DIS is given reference character 79.

A control terminal of the transistor M25, a control terminal of the transistor M26, a first conductive terminal of the transistor M29, a second conductive terminal of the transistor M30, and a first electrode of the capacitor C22 are connected to each other through a first internal node N21. A control terminal of the transistor M21, a first conductive terminal of the transistor M23, a second conductive terminal of the transistor M24, and a first electrode of the capacitor C21 are connected to each other through a second internal node N22. A control terminal of the transistor M22, a control terminal of the transistor M24, a second conductive terminal of the transistor M27, a second conductive terminal of the transistor M28, a control terminal of the transistor M30, and a second electrode of the capacitor C23 are connected to each other through a third internal node N23.

The transistor M21 is connected at its control terminal to the second internal node N22, connected at its first conductive terminal to the second high-level power line, and connected at its second conductive terminal to the output terminal 79. The transistor M22 is connected at its control terminal to the third internal node N23, connected at its first conductive terminal to the output terminal 79, and connected at its second conductive terminal to the second low-level power line. The transistor M23 is connected at its control terminal to the input terminal 73, connected at its first conductive terminal to the second internal node N22, and connected at its second conductive terminal to a first conductive terminal of the transistor M25. The transistor M24 is connected at its control terminal to the third internal node N23, connected at its first conductive terminal to the second high-level power line, and connected at its second conductive terminal to the second internal node N22. The transistor M25 is connected at its control terminal to the first internal node N21, connected at its first conductive terminal to the second conductive terminal of the transistor M23, and connected at its second conductive terminal to the input terminal 73.

The transistor M26 is connected at its control terminal to the first internal node N21, connected at its first conductive terminal to the second high-level power line, and connected at its second conductive terminal to a first conductive terminal of the transistor M27. The transistor M27 is connected at its control terminal to the input terminal 73, connected at its first conductive terminal to the second conductive terminal of the transistor M26, and connected at its second conductive terminal to the third internal node N23. The transistor M28 is connected at its control terminal to the input terminal 72, connected at its first conductive terminal to the input terminal 71, and connected at its second conductive terminal to the third internal node N23. The transistor M29 is connected at its control terminal to the input terminal 72, connected at its first conductive terminal to the first internal node N21, and connected at its second conductive terminal to the second low-level power line. The transistor M30 is connected at its control terminal to the third internal node N23, connected at its first conductive terminal to the input terminal 72, and connected at its second conductive terminal to the first internal node N21.

The capacitor C21 is connected at its first electrode to the control terminal of the transistor M21 and connected at its second electrode to the first conductive terminal of the transistor M21. The capacitor C22 is connected at its first electrode to the control terminal of the transistor M25 and connected at its second electrode to the first conductive terminal of the transistor M25. The capacitor C23 is connected at its first electrode to the input terminal 73 and connected at its second electrode to the third internal node N23.

Note that, in the present embodiment, an initialization signal rising control transistor is implemented by the transistor M21, an initialization signal falling control transistor is implemented by the transistor M22, a second second-internal-node falling control transistor is implemented by the transistor M23, a second-internal-node rising control transistor is implemented by the transistor M24, a first second-internal-node falling control transistor is implemented by the transistor M25, a first third-internal-node control transistor is implemented by the transistor M26, a second third-internal-node control transistor is implemented by the transistor M27, an input control transistor is implemented by the transistor M28, a first-internal-node falling control transistor is implemented by the transistor M29, and a first-internal-node rising control transistor is implemented by the transistor M30. Note also that an initialization signal rising control capacitor is implemented by the capacitor C21, a second-internal-node falling control capacitor is implemented by the capacitor C22, and an initialization signal falling control capacitor is implemented by the capacitor C23.

Figure 25:
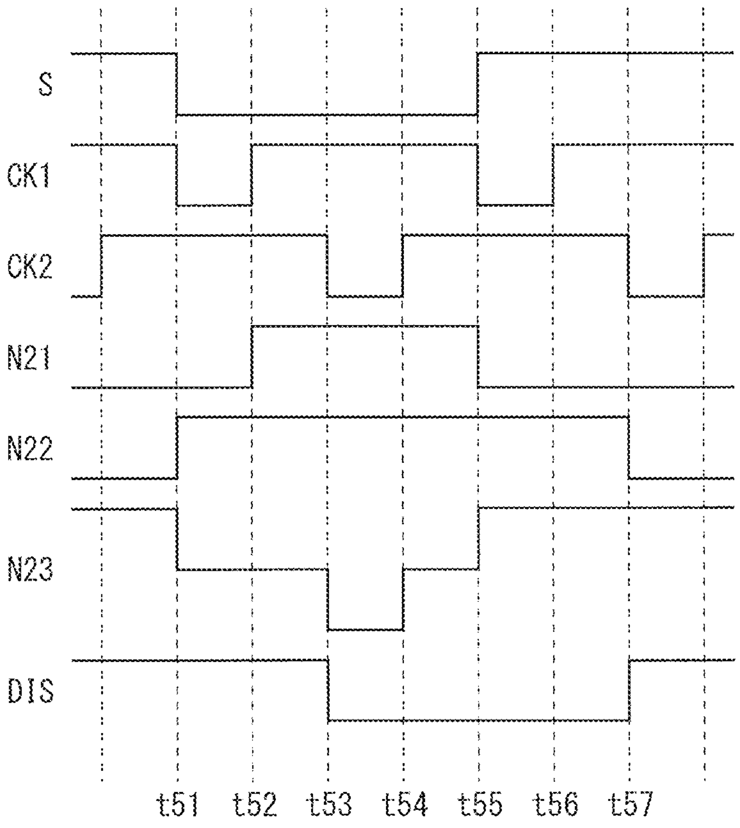
FIG. 25 is a waveform diagram for describing operation of the second unit circuit in the second embodiment.

Next, with reference to FIG. 25, operation of the second unit circuit 25 will be described. At a point in time immediately before time t51, the shift signal S is at high level, the first input clock signal CK1 is at high level, the second input clock signal CK2 is at high level, the potential at the first internal node N21 is at low level, the potential at the second internal node N22 is at low level, the potential at the third internal node N23 is at high level, and the initialization signal DIS is at high level.

At time t51, the shift signal S changes from high level to low level and the first input clock signal CK1 changes from high level to low level. By this, the transistor M28 goes into on state, by which the potential at the third internal node N23 decreases. By the decrease in the potential at the third internal node N23, the transistor M24 goes into on state. By this, the potential at the second internal node N22 increases, by which the transistor M21 goes into off state. In addition, the potential at the third internal node N23 decreases, but at this time, the transistor M22 is maintained in off state. In addition, although the transistor M30 goes into on state at time t51, since the first input clock signal CK1 is maintained at low level during a period from time t51 to time t52, the potential at the first internal node N21 is maintained at low level.

At time t52, the first input clock signal CK1 changes from low level to high level. By this, the transistor M28 and the transistor M29 go into off state. In addition, since the transistor M30 is in on state at this time, the potential at the first internal node N21 increases.

At time t53, the second input clock signal CK2 changes from high level to low level. By this, the potential at the third internal node N23 further decreases through the capacitor C23, by which the transistor M22 goes into on state. As a result, the potential at the output terminal 79 (the potential of the initialization signal DIS) decreases.

At time t54, the second input clock signal CK2 changes from low level to high level. By this, the potential at the third internal node N23 increases through the capacitor C23, by which the transistor M22 goes into off state.

At time t55, the first input clock signal CK1 changes from high level to low level. By this, the transistor M28 and the transistor M29 go into on state. In addition, at time t55, the shift signal S changes from low level to high level. Accordingly, the potential at the third internal node N23 increases, by which the transistor M24 and the transistor M30 go into off state. In addition, the potential at the first internal node N21 decreases. By this, the transistor M25 goes into on state.

At time t56, the first input clock signal CK1 changes from low level to high level. By this, the transistor M28 and the transistor M29 go into off state.

At time t57, the second input clock signal CK2 changes from high level to low level. By this, the transistor M23 goes into on state. At this time, the transistor M25 is in on state and the transistor M24 is in off state. Accordingly, the potential at the second internal node N22 decreases, by which the transistor M21 goes into on state. As a result, the potential at the output terminal 79 (the potential of the initialization signal DIS) increases.

During a period after time t57, as with the point in time immediately before time t51, the potential at the first internal node N21 is maintained at low level, the potential at the second internal node N22 is maintained at low level, the potential at the third internal node N23 is maintained at high level, and the initialization signal DIS is maintained at high level.

<2.4 Operation Based on the Double-Source Scheme>

Figure 26:
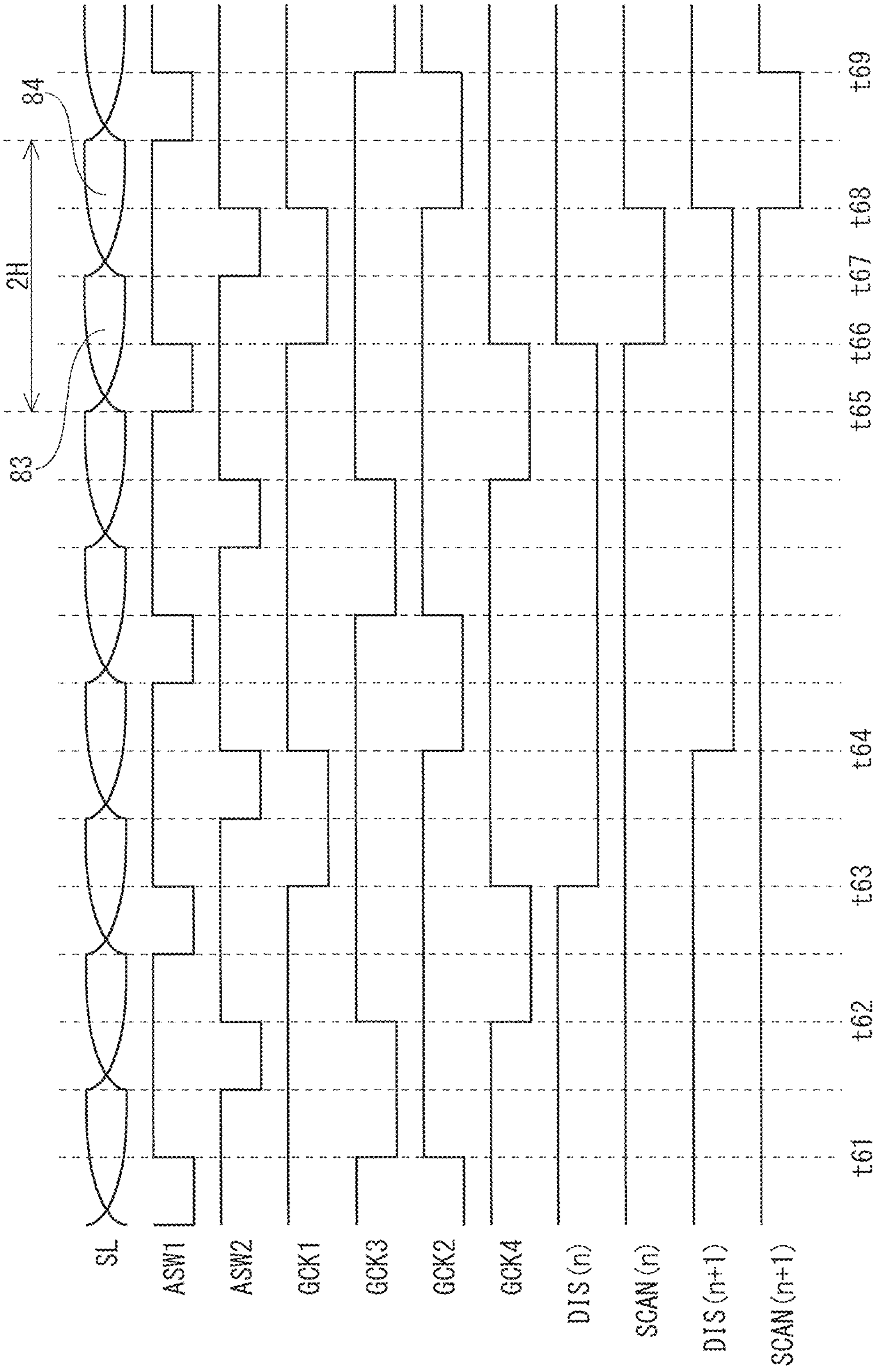
FIG. 26 is a timing chart for describing operation of a gate driver based on the double-source scheme in the second embodiment.
Figure 27:
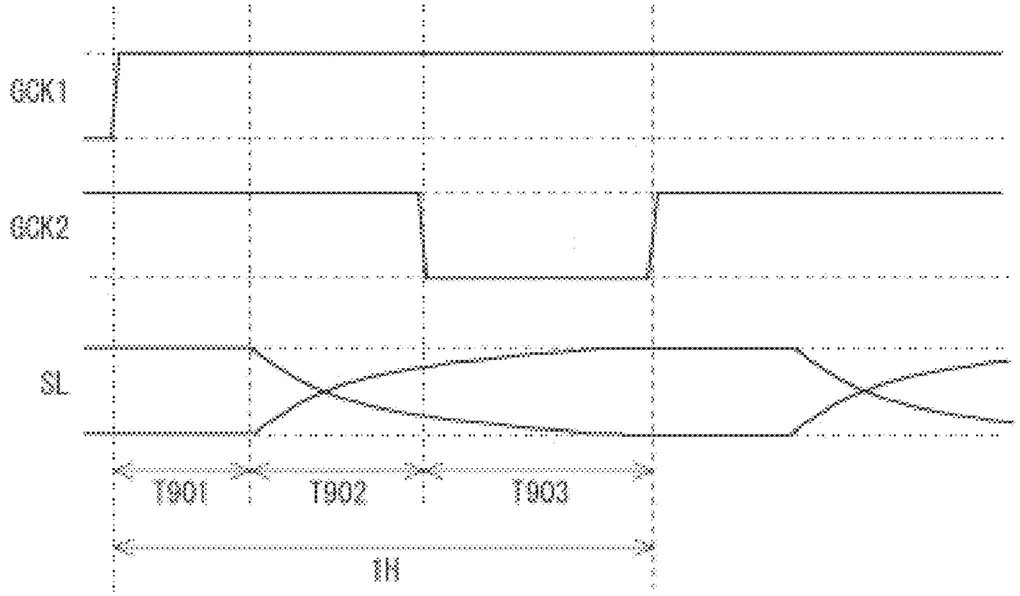
FIG. 27 is a waveform diagram for describing a general driving technique.
Figure 28:
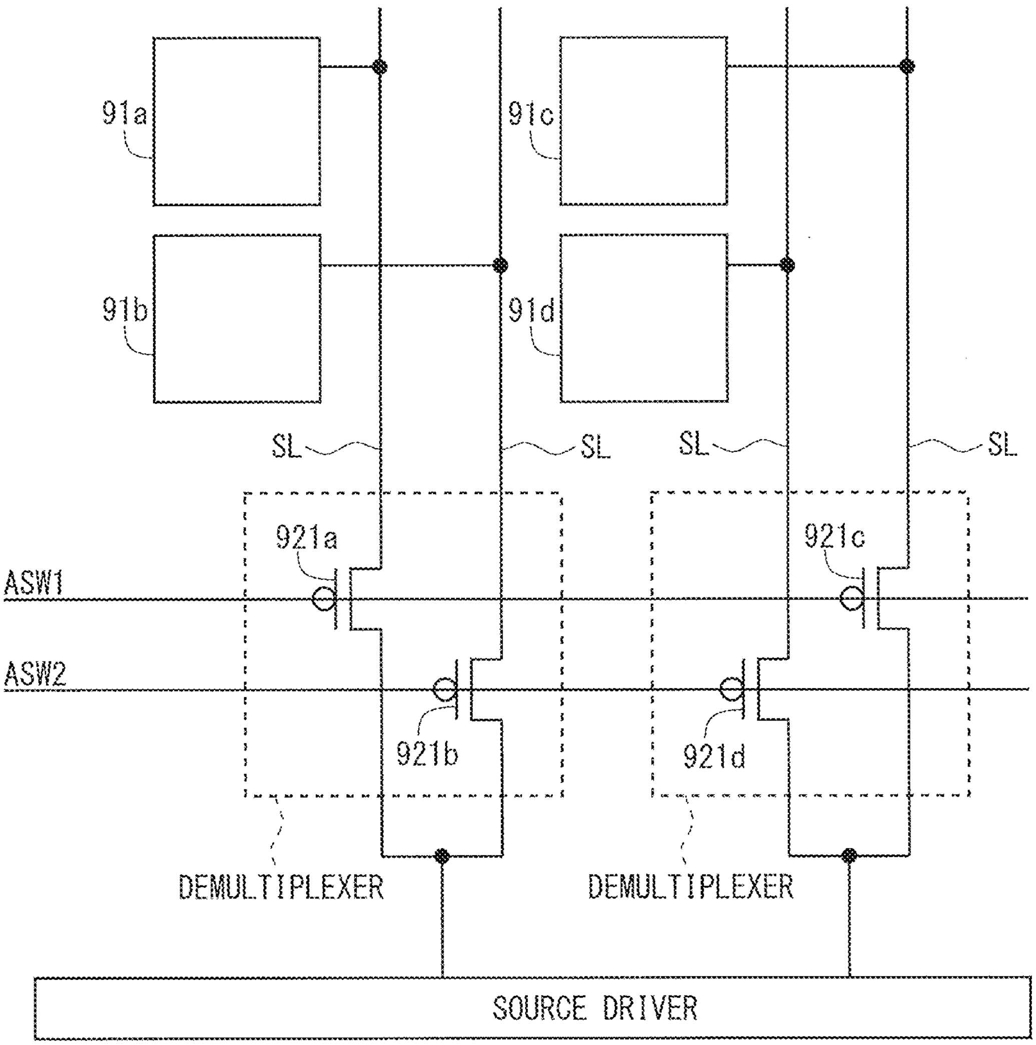
FIG. 28 is a circuit diagram for describing the double-source scheme.
Figure 29:
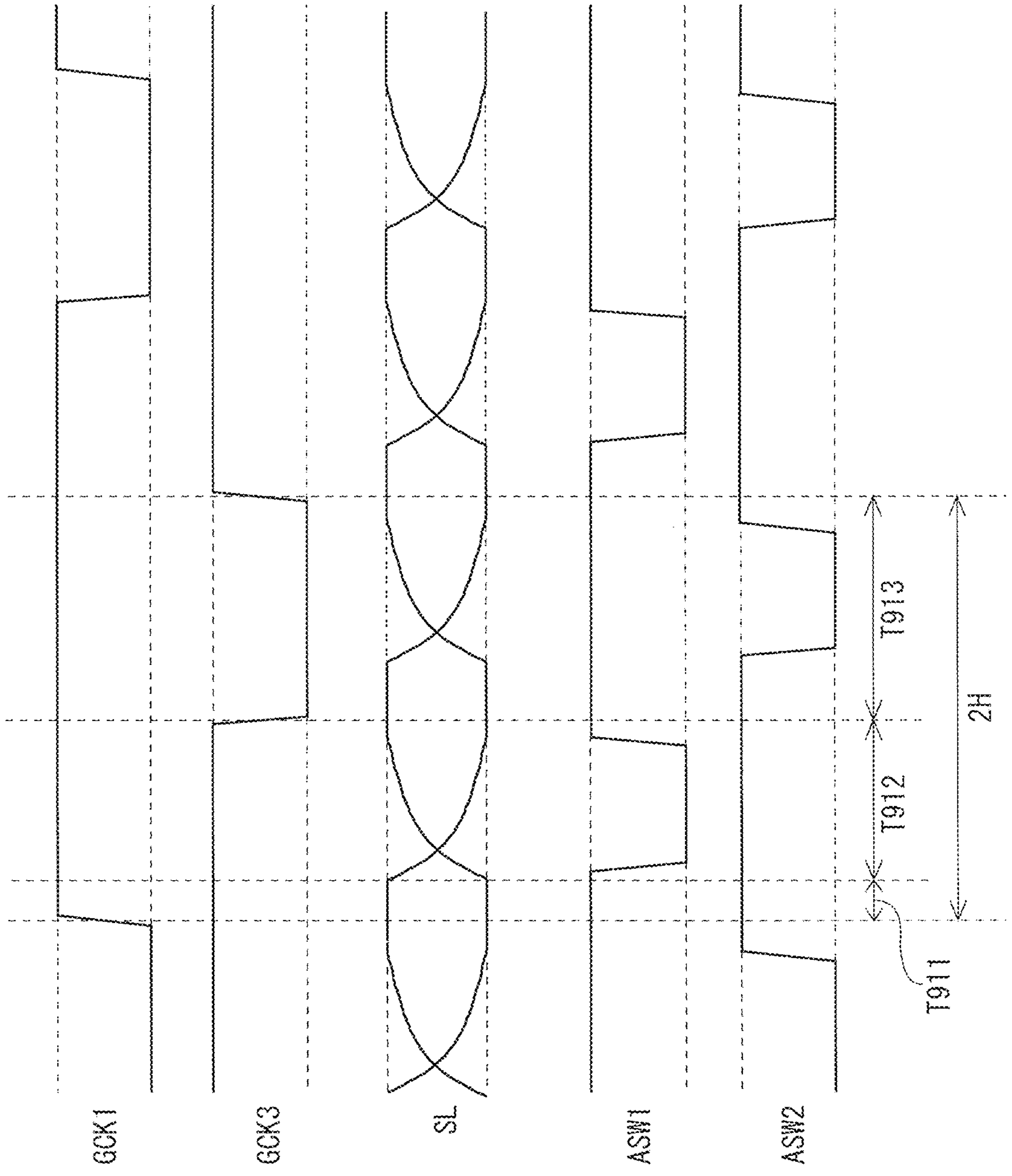
FIG. 29 is a waveform diagram for describing a driving technique for an organic EL display device that adopts the double-source scheme.

Considering the above description, with reference to FIG. 26, operation of the gate driver 21 based on the double-source scheme will be described. Note that here, attention is paid to operation of the gate driver 21 during a period during which writing of data signals to the pixel circuits 11*a*, 11*b*, 11*c*, and 11*d* shown in FIG. 20 is performed. Regarding FIG. 26, a portion given reference character 83 indicates a data signal to be supplied to a pixel circuit 11 in an nth row, and a portion given reference character 84 indicates a data signal to be supplied to a pixel circuit 11 in an (n+1)th row.

At time t61, a gate clock signal GCK3 changes from high level to low level. By this, in a second unit circuit 25(*n*), the potential at the third internal node N23 decreases.

At time t62, a gate clock signal GCK4 changes from high level to low level. By this, in a second unit circuit 25(*n*+1), the potential at the third internal node N23 decreases.

At time t63, by a gate clock signal GCK1 changing from high level to low level, an initialization signal DIS(n) changes from high level to low level. By this, in the pixel circuit 11 in the nth row, the first initialization transistor T1 goes into on state, by which the voltage at the control terminal of the drive transistor T4 is initialized. That is, initialization of the pixel circuit 11 in the nth row is performed.

At time t64, by a gate clock signal GCK2 changing from high level to low level, an initialization signal DIS(n+1) changes from high level to low level. By this, in the pixel circuit 11 in the (n+1)th row, the first initialization transistor T1 goes into on state, by which the voltage at the control terminal of the drive transistor T4 is initialized. That is, initialization of the pixel circuit 11 in the (n+1)th row is performed.

At time t65, a control signal ASW1 changes from high level to low level. By this, a source bus line SL connected to the pixel circuit 11 in the nth row is charged based on a data signal so that writing of the data signal to the pixel circuit 11 in the nth row is performed during a period from time t66 to time t68.

At time t66, by the gate clock signal GCK1 changing from high level to low level, the initialization signal DIS(n) changes from low level to high level. By this, in the pixel circuit 11 in the nth row, the first initialization transistor T1 goes into off state. In addition, by the gate clock signal GCK1 changing from high level to low level, a write control signal SCAN(n) changes from high level to low level. By this, in the pixel circuit 11 in the nth row, the threshold voltage compensation transistor T2, the write control transistor T3, and the second initialization transistor T7 go into on state. In the pixel circuit 11 in the nth row, by the threshold voltage compensation transistor T2 and the write control transistor T3 going into on state, the data signal is provided to the first electrode of the holding capacitor Cst through the write control transistor T3, the drive transistor T4, and the threshold voltage compensation transistor T2, and by the second initialization transistor T7 going into on state, the anode voltage of the organic EL element 12 is initialized based on the initialization voltage Vini. Note that the write control signal SCAN(n) is maintained at low level until time t68. Thus, writing of the data signal to the pixel circuit 11 in the nth row is performed over the period from time t66 to time t68.

At time t67, a control signal ASW2 changes from high level to low level. By this, a source bus line SL connected to the pixel circuit 11 in the (n+1)th row is charged based on a data signal so that writing of the data signal to the pixel circuit 11 in the (n+1)th row is performed during a period from time t68 to time t69.

At time t68, by the gate clock signal GCK1 changing from low level to high level, the write control signal SCAN(n) changes from low level to high level. By this, in the pixel circuit 11 in the nth row, the threshold voltage compensation transistor T2, the write control transistor T3, and the second initialization transistor T7 go into off state, by which the writing of the data signal and the initialization of the anode voltage are completed. In addition, at time t68, by the gate clock signal GCK2 changing from high level to low level, the initialization signal DIS(n+1) changes from low level to high level. By this, in the pixel circuit 11 in the (n+1)th row, the first initialization transistor T1 goes into off state. In addition, by the gate clock signal GCK2 changing from high level to low level, a write control signal SCAN(n+1) changes from high level to low level. By this, in the pixel circuit 11 in the (n+1)th row, the threshold voltage compensation transistor T2, the write control transistor T3, and the second initialization transistor T7 go into on state. In the pixel circuit 11 in the (n+1)th row, by the threshold voltage compensation transistor T2 and the write control transistor T3 going into on state, the data signal is provided to the first electrode of the holding capacitor Cst through the write control transistor T3, the drive transistor T4, and the threshold voltage compensation transistor T2, and by the second initialization transistor T7 going into on state, the anode voltage of the organic EL element 12 is initialized based on the initialization voltage Vini. Note that the write control signal SCAN(n+1) is maintained at low level until time t69. Thus, writing of the data signal to the pixel circuit 11 in the (n+1)th row is performed over the period from time t68 to time t69.

At time t69, by the gate clock signal GCK2 changing from low level to high level, the write control signal SCAN(n+1) changes from low level to high level. By this, in the pixel circuit 11 in the (n+1)th row, the threshold voltage compensation transistor T2, the write control transistor T3, and the second initialization transistor T7 go into off state, by which the writing of the data signal and the initialization of the anode voltage are completed.

<2.5 Effects>

In the present embodiment, too, as with the above-described first embodiment, an organic EL display device is implemented that can increase the refresh rate while suppressing an increase in the area of a picture frame and a reduction in reliability.

3. Others

Although the above-described embodiments make description of an organic EL display device as an example, a display device is not limited thereto. The above-described content of the disclosure can also be applied to inorganic EL display devices, QLED display devices, etc., as long as the display devices use display elements that are driven by a current.

DESCRIPTION OF REFERENCE CHARACTERS

10: DISPLAY UNIT
11: PIXEL CIRCUIT
12: ORGANIC EL ELEMENT
20: PANEL DRIVING UNIT
21: GATE DRIVER
22: LIGHT-EMISSION CONTROL CIRCUIT (EMISSION DRIVER)
24: FIRST UNIT CIRCUIT (A UNIT CIRCUIT THAT CONSTITUTES EACH STAGE OF A SHIFT REGISTER THAT IMPLEMENTS A WRITE CONTROL CIRCUIT)
25: SECOND UNIT CIRCUIT (A UNIT CIRCUIT THAT CONSTITUTES EACH STAGE OF A SHIFT REGISTER THAT IMPLEMENTS AN INITIALIZATION CONTROL CIRCUIT)
30: VIDEO SIGNAL LINE DRIVING UNIT
31: SOURCE DRIVER
32: DATA SIGNAL SPLITTER CIRCUIT
211: WRITE CONTROL CIRCUIT
212: INITIALIZATION CONTROL CIRCUIT
320: DEMULTIPLEXER
321: CONNECTION CONTROL TRANSISTOR
DIS: INITIALIZATION CONTROL LINE AND INITIALIZATION SIGNAL
SCAN: WRITE CONTROL LINE AND WRITE CONTROL SIGNAL
EM: LIGHT-EMISSION CONTROL LINE AND LIGHT-EMISSION CONTROL SIGNAL
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: POWER SUPPLY CONTROL TRANSISTOR
T6: LIGHT-EMISSION CONTROL TRANSISTOR
T7: SECOND INITIALIZATION TRANSISTOR

The invention claimed is:

1. A display device including a plurality of pixel circuits each including a display element driven by a current, the display device comprising:

a display unit including a plurality of write control lines extending in a first direction; a plurality of initialization control lines extending in the first direction; a plurality of data signal lines extending in a second direction orthogonal to the first direction; and the plurality of pixel circuits each provided corresponding to at least one of the plurality of write control lines, one of the plurality of initialization control lines, and one of the plurality of data signal lines;

a data signal line drive circuit configured to apply a data signal to the plurality of data signal lines;

a write control circuit configured to apply a write control signal to the plurality of write control lines, the write control signal controlling writing of the data signal to a pixel circuit; and an initialization control circuit configured to apply an initialization signal to the plurality of initialization control lines, the initialization signal controlling initialization of a pixel circuit, wherein a first picture-frame region and a second picture-frame region are provided outside the display unit, as regions for disposing the write control circuit and the initialization control circuit, the first picture-frame region being near a one-edge side of the display unit regarding the first direction, and the second picture-frame region being near an other-edge side of the display unit regarding the first direction, the write control circuit includes:

a first write control circuit disposed in the first picture-frame region and configured to apply the write control signal to even-numbered write control lines;

a second write control circuit disposed in the second picture-frame region and configured to apply the write control signal to the even-numbered write control lines;

a third write control circuit disposed in the first picture-frame region and configured to apply the write control signal to odd-numbered write control lines; and a fourth write control circuit disposed in the second picture-frame region and configured to apply the write control signal to the odd-numbered write control lines, the initialization control circuit includes:

a first initialization control circuit disposed in the first picture-frame region and configured to apply the initialization signal to even-numbered initialization control lines; and a second initialization control circuit disposed in the second picture-frame region and configured to apply the initialization signal to odd-numbered initialization control lines, a first unit circuit constituting each stage of a shift register included in each of the first write control circuit, the second write control circuit, the third write control circuit, and the fourth write control circuit corresponds to one of the plurality of write control lines, the first unit circuit includes a plurality of transistors, the plurality of transistors included in the first unit circuit are all thin-film transistors having a channel layer formed of low-temperature polysilicon, a second unit circuit constituting each stage of a shift register included in each of the first initialization control circuit and the second initialization control circuit corresponds to one of the plurality of initialization control lines, one clock signal of multi-phase clock signals is provided as a first input clock signal to the second unit circuit, and the second unit circuit captures a value of a shift signal based on a pulse of the first input clock signal, holds the value internally until a next pulse of the first input clock signal occurs, and applies the initialization signal to a corresponding initialization control line based on the value held internally.

2. The display device according to claim 1, wherein two data signal lines are provided for one column of pixel circuits arranged side by side in the second direction, a first pixel circuit is connected to one of the two data signal lines and a second pixel circuit is connected to another one of the two data signal lines, the first pixel circuit and the second pixel circuit being two pixel circuits arranged side by side in the second direction, a connection switching circuit is provided between the plurality of data signal lines and the data signal line drive circuit, the connection switching circuit having two connection control transistors for each output terminal of the data signal line drive circuit, the two connection control transistors being for controlling an electrical connection state between the output terminal and corresponding two data signal lines, and in the connection switching circuit, the two connection control transistors sequentially go into on state for a predetermined period in one period, with two horizontal scanning periods serving as the one period.

3. The display device according to claim 1, further comprising:

a first high-level power line configured to supply a high-level power supply voltage for driving the display element;

a first low-level power line configured to supply a low-level power supply voltage for driving the display element; and an initialization power line configured to supply an initialization voltage, wherein each of the plurality of pixel circuits includes:

the display element provided between the first high-level power line and the first low-level power line, and having a first terminal on a first high-level power line side and a second terminal on a first low-level power line side;

a drive transistor provided in series with the display element, and having a control terminal, a first conductive terminal, and a second conductive terminal;

a holding capacitor having one terminal connected to the control terminal of the drive transistor; and another terminal connected to the first high-level power line;

a write control transistor having a control terminal connected to one of the plurality of write control lines; a first conductive terminal connected to one of the plurality of data signal lines; and a second conductive terminal connected to the first conductive terminal of the drive transistor;

a threshold voltage compensation transistor having a control terminal connected to one of the plurality of initialization control lines; a first conductive terminal connected to the second conductive terminal of the drive transistor; and a second conductive terminal connected to the control terminal of the drive transistor; and an initialization transistor having a control terminal connected to one of the plurality of initialization control lines; a first conductive terminal connected to the control terminal of the drive transistor; and a second conductive terminal connected to the initialization power line, an initialization control line connected to the control terminal of the threshold voltage compensation transistor differs from an initialization control line connected to the control terminal of the initialization transistor, the threshold voltage compensation transistor and the initialization transistor are N-channel type thin-film transistors having a channel layer formed of an oxide semiconductor, the drive transistor and the write control transistor are P-channel type thin-film transistors having a channel layer formed of low-temperature polysilicon, and writing of the data signal to each pixel circuit is performed by maintaining a write control signal applied to a write control line connected to the control terminal of the write control transistor at on level for a predetermined period during a period from when an initialization signal applied to an initialization control line connected to the control terminal of the initialization transistor changes from on level to off level until an initialization signal applied to an initialization control line connected to the control terminal of the threshold voltage compensation transistor changes from on level to off level, after the initialization signal applied to the initialization control line connected to the control terminal of the initialization transistor and the initialization signal applied to the initialization control line connected to the control terminal of the threshold voltage compensation transistor sequentially change from off level to on level.

4. The display device according to claim 3, further comprising:

a plurality of light-emission control lines disposed in the display unit and extending in the first direction; and a light-emission control circuit configured to apply a light-emission control signal to the plurality of light-emission control lines, the light-emission control signal controlling light emission of the display element, wherein each of the plurality of pixel circuits further includes:

a power supply control transistor having a control terminal connected to one of the plurality of light-emission control lines; a first conductive terminal connected to the first high-level power line; and a second conductive terminal connected to the first conductive terminal of the drive transistor; and a light-emission control transistor having a control terminal connected to one of the plurality of light-emission control lines; a first conductive terminal connected to the second conductive terminal of the drive transistor; and a second conductive terminal connected to the first terminal of the display element, a light-emission control line connected to the control terminal of the power supply control transistor and a light-emission control line connected to the control terminal of the light-emission control transistor are identical, and the power supply control transistor and the light-emission control transistor are P-channel type thin-film transistors having a channel layer formed of low-temperature polysilicon.

5. The display device according to claim 3, wherein the second unit circuit includes:

an N-channel type thin-film transistor having a channel layer formed of an oxide semiconductor; and a P-channel type thin-film transistor having a channel layer formed of low-temperature polysilicon.

6. The display device according to claim 5, further comprising:

a second high-level power line configured to supply a high-level power supply voltage for the initialization control circuit; and a second low-level power line configured to supply a low-level power supply voltage for the initialization control circuit, wherein the second unit circuit includes:

a first internal node;

an input terminal configured to be provided with a shift signal outputted from a preceding stage;

a first output terminal configured to output the initialization signal to a corresponding initialization control line;

a second output terminal configured to output a shift signal to be provided to a subsequent stage;

an input control transistor having a control terminal configured to be provided with the first input clock signal; a first conductive terminal connected to the first internal node; and a second conductive terminal connected to the input terminal;

an initialization signal rising control transistor having a control terminal connected to the first internal node; a first conductive terminal connected to the second high-level power line; and a second conductive terminal connected to the first output terminal; and an initialization signal falling control transistor having a control terminal connected to the first internal node; a first conductive terminal connected to the first output terminal; and a second conductive terminal connected to the second low-level power line, the input control transistor and the initialization signal rising control transistor are P-channel type thin-film transistors having a channel layer formed of low-temperature polysilicon, and the initialization signal falling control transistor is an N-channel type thin-film transistor having a channel layer formed of an oxide semiconductor.

7. The display device according to claim 6, wherein of the multi-phase clock signals, a clock signal delayed in phase by 180 degrees relative to the first input clock signal is provided as a second input clock signal to the second unit circuit, each second unit circuit further includes:

a second internal node;

a third internal node;

a shift signal rising control transistor having a control terminal connected to the first output terminal; a first conductive terminal connected to the second high-level power line; and a second conductive terminal connected to the second output terminal;

a shift signal falling control transistor having a control terminal connected to the third internal node; a first conductive terminal connected to the second output terminal; and a second conductive terminal configured to be provided with the second input clock signal;

a second-internal-node rising control transistor having a control terminal connected to the first output terminal; a first conductive terminal connected to the second high-level power line; and a second conductive terminal connected to the second internal node;

a second-internal-node falling control transistor having a control terminal configured to be provided with the second input clock signal; a first conductive terminal connected to the second internal node; and a second conductive terminal connected to the first internal node;

an isolating transistor having a control terminal connected to the second low-level power line; a first conductive terminal connected to the first internal node; and a second conductive terminal connected to the third internal node; and a shift signal falling control capacitor having one terminal connected to the control terminal of the shift signal falling control transistor; and another terminal connected to the first conductive terminal of the shift signal falling control transistor, and the shift signal rising control transistor, the shift signal falling control transistor, the second-internal-node rising control transistor, the second-internal-node falling control transistor, and the isolating transistor are P-channel type thin-film transistors having a channel layer formed of low-temperature polysilicon.

8. The display device according to claim 7, wherein the shift signal rising control transistor and the shift signal falling control transistor have a channel width of 4 micrometers or less.

9. The display device according to claim 3, wherein the oxide semiconductor contains indium, gallium, zinc, and oxygen.

10. The display device according to claim 1, further comprising:

a first high-level power line configured to supply a high-level power supply voltage for driving the display element;

a first low-level power line configured to supply a low-level power supply voltage for driving the display element; and an initialization power line configured to supply an initialization voltage, wherein each of the plurality of pixel circuits includes:

the display element provided between the first high-level power line and the first low-level power line, and having a first terminal on a first high-level power line side and a second terminal on a first low-level power line side;

a drive transistor provided in series with the display element, and having a control terminal, a first conductive terminal, and a second conductive terminal;

a holding capacitor having one terminal connected to the control terminal of the drive transistor; and another terminal connected to the first high-level power line;

a write control transistor having a control terminal connected to one of the plurality of write control lines; a first conductive terminal connected to one of the plurality of data signal lines; and a second conductive terminal connected to the first conductive terminal of the drive transistor;

a threshold voltage compensation transistor having a control terminal connected to one of the plurality of write control lines; a first conductive terminal connected to the second conductive terminal of the drive transistor; and a second conductive terminal connected to the control terminal of the drive transistor; and an initialization transistor having a control terminal connected to one of the plurality of initialization control lines; a first conductive terminal connected to the control terminal of the drive transistor; and a second conductive terminal connected to the initialization power line, a write control line connected to the control terminal of the write control transistor and a write control line connected to the control terminal of the threshold voltage compensation transistor are identical, the drive transistor, the write control transistor, the threshold voltage compensation transistor, and the initialization transistor are P-channel type thin-film transistors having a channel layer formed of low-temperature polysilicon, and writing of the data signal to each pixel circuit is performed by maintaining a write control signal applied to a write control line connected to the control terminal of the write control transistor and the control terminal of the threshold voltage compensation transistor at on level for a predetermined period after an initialization signal applied to an initialization control line connected to the control terminal of the initialization transistor is maintained at on level for a predetermined period.

11. The display device according to claim 10, further comprising:

a plurality of light-emission control lines disposed in the display unit and extending in the first direction; and a light-emission control circuit configured to apply a light-emission control signal to the plurality of light-emission control lines, the light-emission control signal controlling light emission of the display element, wherein each of the plurality of pixel circuits further includes:

a power supply control transistor having a control terminal connected to one of the plurality of light-emission control lines; a first conductive terminal connected to the first high-level power line; and a second conductive terminal connected to the first conductive terminal of the drive transistor; and a light-emission control transistor having a control terminal connected to one of the plurality of light-emission control lines; a first conductive terminal connected to the second conductive terminal of the drive transistor; and a second conductive terminal connected to the first terminal of the display element, a light-emission control line connected to the control terminal of the power supply control transistor and a light-emission control line connected to the control terminal of the light-emission control transistor are identical, and the power supply control transistor and the light-emission control transistor are P-channel type thin-film transistors having a channel layer formed of low-temperature polysilicon.

12. The display device according to claim 10, wherein each second unit circuit includes a plurality of transistors, and the plurality of transistors included in the second unit circuit are all P-channel type thin film transistors having a channel layer formed of low-temperature polysilicon.

13. The display device according to claim 12, further comprising:

a second high-level power line configured to supply a high-level power supply voltage for the initialization control circuit; and a second low-level power line configured to supply a low-level power supply voltage for the initialization control circuit, wherein of the multi-phase clock signals, a clock signal delayed in phase by 180 degrees relative to the first input clock signal is provided as a second input clock signal to the second unit circuit, each second unit circuit includes:

a first internal node;

a second internal node;

a third internal node;

an output terminal configured to output the initialization signal to a corresponding initialization control line;

an input terminal configured to be provided with an initialization signal as a shift signal, the initialization signal being outputted from a preceding stage;

an input control transistor having a control terminal configured to be provided with the first input clock signal; a first conductive terminal connected to the input terminal; and a second conductive terminal connected to the third internal node;

an initialization signal falling control transistor having a control terminal connected to the third internal node; a first conductive terminal connected to the output terminal; and a second conductive terminal connected to the second low-level power line;

an initialization signal rising control transistor having a control terminal connected to the second internal node; a first conductive terminal connected to the second high-level power line; and a second conductive terminal connected to the output terminal;

a first second-internal-node falling control transistor having a control terminal connected to the first internal node; a first conductive terminal; and a second conductive terminal configured to be provided with the second input clock signal;

a second second-internal-node falling control transistor having a control terminal configured to be provided with the second input clock signal; a first conductive terminal connected to the second internal node; and a second conductive terminal connected to the first conductive terminal of the first second-internal-node falling control transistor;

a second-internal-node rising control transistor having a control terminal connected to the third internal node; a first conductive terminal connected to the second high-level power line; and a second conductive terminal connected to the second internal node;

an initialization signal falling control capacitor having one terminal configured to be provided with the second input clock signal; and another terminal connected to the third internal node;

an initialization signal rising control capacitor having one terminal connected to the control terminal of the initialization signal rising control transistor; and another terminal connected to the first conductive terminal of the initialization signal rising control transistor; and a second-internal-node falling control capacitor having one terminal connected to the control terminal of the first second-internal-node falling control transistor; and another terminal connected to the first conductive terminal of the first second-internal-node falling control transistor.

14. The display device according to claim 13, wherein each second unit circuit further includes:

a first-internal-node rising control transistor having a control terminal connected to the third internal node; a first conductive terminal configured to be provided with the first input clock signal; and a second conductive terminal connected to the first internal node;

a first-internal-node falling control transistor having a control terminal configured to be provided with the first input clock signal; a first conductive terminal connected to the first internal node; and a second conductive terminal connected to the second low-level power line;

a first third-internal-node control transistor having a control terminal connected to the first internal node; a first conductive terminal connected to the second high-level power line; and a second conductive terminal; and a second third-internal-node control transistor having a control terminal configured to be provided with the second input clock signal; a first conductive terminal connected to the second conductive terminal of the first third-internal-node control transistor; and a second conductive terminal connected to the third internal node.

15. The display device according to claim 1, wherein the multi-phase clock signals include a first clock signal; a second clock signal delayed in phase by 90 degrees relative to the first clock signal; a third clock signal delayed in phase by 180 degrees relative to the first clock signal; and a fourth clock signal delayed in phase by 270 degrees relative to the first clock signal, the first clock signal and the third clock signal are provided to the first write control circuit, the third write control circuit, and the first initialization control circuit, and the second clock signal and the fourth clock signal are provided to the second write control circuit, the fourth write control circuit, and the second initialization control circuit.

* * * * *